United States Patent
Rachow

(10) Patent No.: US 12,269,436 B2
(45) Date of Patent: Apr. 8, 2025

(54) BRACKET AND MODULAR ASSEMBLY FOR FLUID SPRAY SYSTEM

(71) Applicant: A. Raymond et Cie, Grenoble (FR)

(72) Inventor: Larry M. Rachow, Lenox, MI (US)

(73) Assignee: A. RAYMOND ET CIE, Grenoble (FR)

( * ) Notice: Subject to any disclaimer, the term of this patent is extended or adjusted under 35 U.S.C. 154(b) by 734 days.

(21) Appl. No.: 16/924,896

(22) Filed: Jul. 9, 2020

(65) Prior Publication Data

US 2022/0009453 A1 Jan. 13, 2022

(51) Int. Cl.
*B60S 1/52* (2006.01)
*B05B 15/65* (2018.01)
*B60R 11/00* (2006.01)

(52) U.S. Cl.
CPC .............. *B60S 1/52* (2013.01); *B05B 15/65* (2018.02); *B60R 11/00* (2013.01)

(58) Field of Classification Search
CPC .............. G01S 7/481; B60R 11/00–06; B05B 15/65–656; G02B 27/0006
See application file for complete search history.

(56) References Cited

U.S. PATENT DOCUMENTS

| | | | | |
|---|---|---|---|---|
| 2,830,743 A * | 4/1958 | Rimsha | ................. | F16K 31/404 |
| | | | | 222/335 |
| 3,594,846 A * | 7/1971 | Kimura | ................... | B60S 1/482 |
| | | | | 15/250.02 |
| 3,655,163 A * | 4/1972 | Rattan | ................... | F16K 31/404 |
| | | | | 251/30.03 |
| 4,290,454 A * | 9/1981 | Shetler | .................. | F16K 15/142 |
| | | | | 137/853 |
| 4,295,631 A * | 10/1981 | Allen | .................... | F16K 31/402 |
| | | | | 251/30.03 |
| 4,357,959 A * | 11/1982 | Shetler | .................. | F16K 15/142 |
| | | | | 137/853 |
| 4,860,990 A * | 8/1989 | Fukuzawa | ............. | F16K 31/404 |
| | | | | 251/126 |
| 4,955,539 A * | 9/1990 | Ruttenberg | ............. | B05B 1/083 |
| | | | | 137/853 |
| 4,955,543 A * | 9/1990 | Orth | ........................ | B60S 1/528 |
| | | | | 239/533.15 |
| 6,073,905 A * | 6/2000 | Wilson | ................... | B01D 46/71 |
| | | | | 251/30.02 |

(Continued)

FOREIGN PATENT DOCUMENTS

CN 106660059 A 5/2017
DE 102015015910 B3 * 6/2017

(Continued)

*Primary Examiner* — Omair Chaudhri
(74) *Attorney, Agent, or Firm* — Warner Norcross + Judd LLP

(57) ABSTRACT

The present disclosure provides a combination bracket for mounting multiple components of a fluid spray system, such a fluid spray system for a vehicle comprising. A spray nozzle is coupleable with the combination bracket and adapted to spray fluid onto a sensor mounted to the combination bracket. A check valve is coupleable with the combination bracket and adapted to deliver fluid to the spray nozzle. Modular assembles, systems, and vehicles incorporating a combination bracket are also provided.

26 Claims, 25 Drawing Sheets

(56) References Cited

U.S. PATENT DOCUMENTS

| | | | | |
|---|---|---|---|---|
| 6,463,621 B1* | 10/2002 | Zimmer | ............... | B60S 1/522 |
| | | | | 239/533.13 |
| 7,204,432 B2* | 4/2007 | Yon | ............... | B60S 1/52 |
| | | | | 239/284.1 |
| 8,061,630 B2 | 11/2011 | Utz | | |
| 8,186,608 B2 | 5/2012 | Rathey et al. | | |
| 8,979,288 B2* | 3/2015 | Negel | ............... | B60R 1/06 |
| | | | | 248/477 |
| 10,144,394 B1 | 12/2018 | Rice | | |
| 10,328,906 B2* | 6/2019 | Hester | ............... | B60R 11/04 |
| 2002/0166901 A1* | 11/2002 | Matsumoto | ............... | B05B 15/40 |
| | | | | 239/284.1 |
| 2003/0089409 A1* | 5/2003 | Morimoto | ............... | F16K 15/144 |
| | | | | 137/859 |
| 2003/0178506 A1* | 9/2003 | Kondou | ............... | B60S 1/52 |
| | | | | 239/599 |
| 2003/0234303 A1* | 12/2003 | Berning | ............... | B60S 1/52 |
| | | | | 239/589.1 |
| 2004/0045605 A1* | 3/2004 | Floh | ............... | F16K 7/075 |
| | | | | 137/512.15 |
| 2004/0074988 A1* | 4/2004 | Sternbach | ............... | B60S 1/52 |
| | | | | 239/284.1 |
| 2004/0188541 A1* | 9/2004 | Maruyama | ............... | F16K 15/144 |
| | | | | 239/570 |
| 2004/0250858 A1* | 12/2004 | Steerman | ............... | F16K 15/025 |
| | | | | 137/540 |
| 2005/0087633 A1* | 4/2005 | Gopalan | ............... | B05B 1/34 |
| | | | | 239/589.1 |
| 2005/0184261 A1* | 8/2005 | Stern | ............... | F16K 31/404 |
| | | | | 251/30.03 |
| 2007/0018013 A1* | 1/2007 | Lasebnick | ............... | B60S 1/52 |
| | | | | 264/318 |
| 2007/0257133 A1 | 11/2007 | Bettenhausen et al. | | |
| 2008/0169358 A1* | 7/2008 | Hofmann | ............... | B60S 1/52 |
| | | | | 239/284.1 |
| 2009/0122141 A1* | 5/2009 | Nakamura | ............... | B60R 11/04 |
| | | | | 348/148 |
| 2010/0078509 A1* | 4/2010 | Utz | ............... | B05B 1/10 |
| | | | | 239/590 |
| 2010/0237171 A1* | 9/2010 | Rathey | ............... | B05B 15/654 |
| | | | | 239/284.1 |
| 2011/0061692 A1* | 3/2011 | Gopalan | ............... | B05B 1/08 |
| | | | | 134/169 R |
| 2011/0266375 A1* | 11/2011 | Ono | ............... | B60S 1/0848 |
| | | | | 239/589 |
| 2011/0292212 A1* | 12/2011 | Tanabe | ............... | B05B 1/08 |
| | | | | 348/148 |
| 2012/0018011 A1* | 1/2012 | Koga | ............... | F16K 15/145 |
| | | | | 137/511 |
| 2012/0192978 A1* | 8/2012 | Carlson | ............... | B60H 1/249 |
| | | | | 454/162 |
| 2014/0226012 A1* | 8/2014 | Achenbach | ............... | B60R 11/04 |
| | | | | 348/148 |
| 2015/0040953 A1* | 2/2015 | Kikuta | ............... | B60S 1/56 |
| | | | | 134/123 |
| 2015/0078940 A1* | 3/2015 | Kikuta | ............... | F04B 17/03 |
| | | | | 417/443 |
| 2015/0183406 A1* | 7/2015 | Tanaka | ............... | B08B 3/02 |
| | | | | 134/99.1 |
| 2015/0353057 A1* | 12/2015 | Witte | ............... | B60S 1/0848 |
| | | | | 134/115 R |
| 2016/0153576 A1* | 6/2016 | Mortensen | ............... | F16F 1/047 |
| | | | | 251/129.15 |
| 2016/0318486 A1* | 11/2016 | Weitzel | ............... | B60S 1/52 |
| 2016/0339875 A1* | 11/2016 | Ina | ............... | B60S 1/522 |
| 2016/0375876 A1* | 12/2016 | Silc | ............... | B60S 1/54 |
| | | | | 134/37 |
| 2017/0015283 A1* | 1/2017 | Weitzel | ............... | F16K 15/046 |
| 2017/0021809 A1* | 1/2017 | Trebouet | ............... | B08B 5/02 |
| 2017/0021810 A1* | 1/2017 | Trebouet | ............... | B60S 1/62 |
| 2017/0036647 A1* | 2/2017 | Zhao | ............... | G02B 27/0006 |
| 2017/0057466 A1* | 3/2017 | Renke | ............... | B60S 1/52 |
| 2017/0080863 A1* | 3/2017 | Henion | ............... | B60R 1/0602 |
| 2017/0120875 A1* | 5/2017 | Kong | ............... | B60S 1/52 |
| 2017/0146173 A1 | 5/2017 | Chaupin et al. | | |
| 2017/0304511 A1* | 10/2017 | Harpham | ............... | A61M 1/734 |
| 2017/0326560 A1* | 11/2017 | Kanda | ............... | B60S 1/52 |
| 2017/0349150 A1* | 12/2017 | Ostergren | ............... | B05B 9/002 |
| 2018/0029566 A1* | 2/2018 | Gopalan | ............... | B60S 1/52 |
| 2018/0078974 A1* | 3/2018 | Karasik | ............... | B60S 1/56 |
| 2018/0126921 A1* | 5/2018 | Koseki | ............... | B08B 5/02 |
| 2018/0186341 A1* | 7/2018 | Kimura | ............... | H04N 7/18 |
| 2018/0216749 A1* | 8/2018 | Pedersen | ............... | F16K 31/404 |
| 2018/0272998 A1* | 9/2018 | Schmidt | ............... | B05B 7/2424 |
| 2018/0347715 A1* | 12/2018 | Schiesser | ............... | F16K 31/0672 |
| 2019/0039531 A1* | 2/2019 | Wilson | ............... | B60S 1/528 |
| 2019/0054855 A1* | 2/2019 | Krishnan | ............... | B60Q 1/2661 |
| 2019/0061698 A1* | 2/2019 | Mizuno | ............... | B60S 1/0848 |
| 2019/0099768 A1* | 4/2019 | Romack | ............... | B60S 1/56 |
| 2019/0116296 A1* | 4/2019 | Romack | ............... | B05B 1/06 |
| 2019/0162951 A1* | 5/2019 | Leonelli, Jr. | ............... | B60S 1/524 |
| 2019/0234547 A1 | 8/2019 | Gauthier | | |
| 2019/0270433 A1* | 9/2019 | Hester | ............... | B60S 1/56 |
| 2020/0001833 A1 | 1/2020 | Lomer | | |
| 2020/0001834 A1* | 1/2020 | Grasso | ............... | B60S 1/528 |
| 2020/0009596 A1 | 1/2020 | Rachow | | |
| 2020/0061643 A1 | 2/2020 | Rachow | | |
| 2020/0114881 A1* | 4/2020 | Yamauchi | ............... | F04B 11/0033 |
| 2020/0156597 A1* | 5/2020 | Hahn | ............... | G02B 7/1815 |
| 2020/0247367 A1* | 8/2020 | Sakai | ............... | B60S 1/52 |
| 2020/0262396 A1* | 8/2020 | Keller | ............... | B60S 1/60 |
| 2020/0298283 A1 | 9/2020 | Saito et al. | | |
| 2020/0307524 A1* | 10/2020 | Morita | ............... | B60S 1/54 |
| 2020/0378520 A1* | 12/2020 | Domoto | ............... | F16K 27/00 |
| 2020/0393550 A1* | 12/2020 | Hamilton | ............... | G01S 17/931 |
| 2020/0398795 A1* | 12/2020 | Sykula | ............... | G02B 27/0006 |
| 2021/0094079 A1* | 4/2021 | Krishnan | ............... | B08B 1/006 |
| 2021/0094474 A1* | 4/2021 | Vetter | ............... | B60S 1/528 |
| 2021/0253068 A1* | 8/2021 | Baudouin | ............... | B60S 1/56 |
| 2021/0284101 A1* | 9/2021 | Grasso | ............... | B60S 1/528 |
| 2021/0331649 A1* | 10/2021 | Krishnan | ............... | B60S 1/56 |
| 2022/0402462 A1* | 12/2022 | Lim | ............... | B60S 1/54 |
| 2023/0132583 A1* | 5/2023 | Matsunaga | ............... | B05B 1/046 |
| | | | | 239/598 |
| 2023/0182668 A1* | 6/2023 | Cavgun | ............... | F16B 5/0225 |
| | | | | 296/193.02 |

FOREIGN PATENT DOCUMENTS

| | | |
|---|---|---|
| JP | 2016000599 A | 1/2016 |
| JP | 2017193323 A | 10/2017 |
| WO | 2019002185 | 1/2019 |

\* cited by examiner

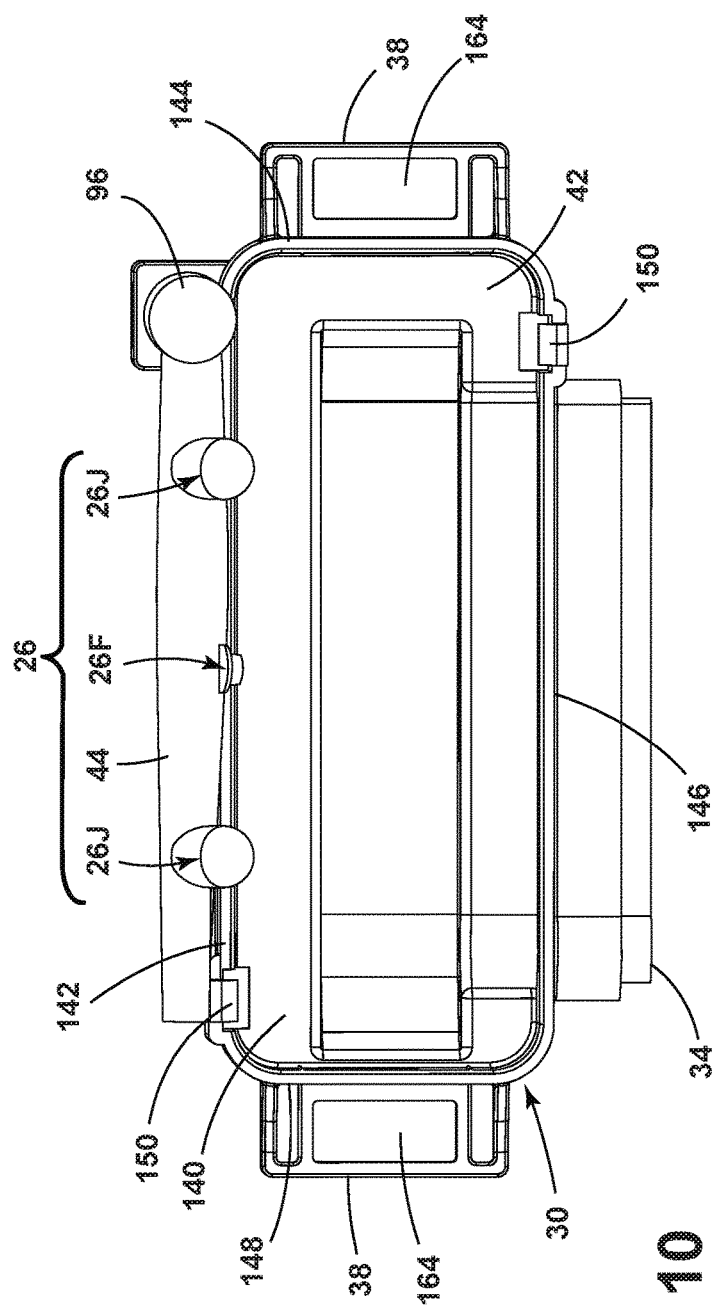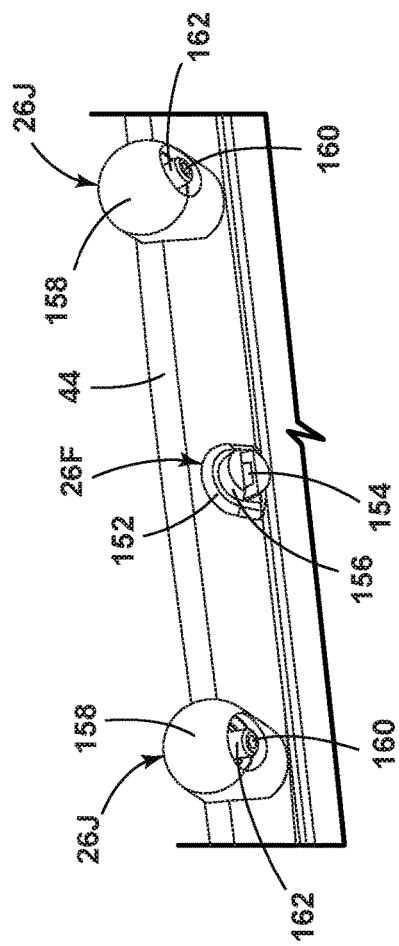
FIG. 10
FIG. 11

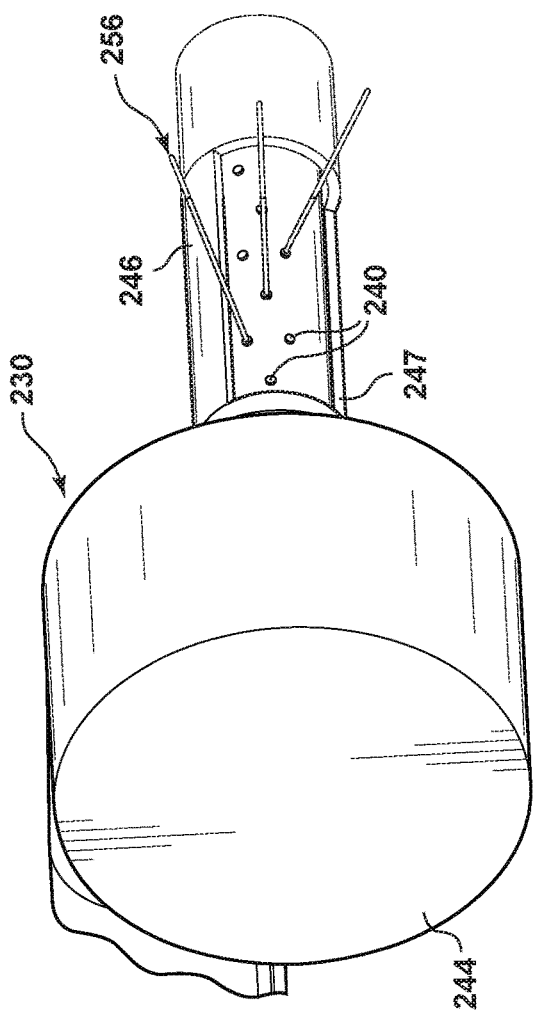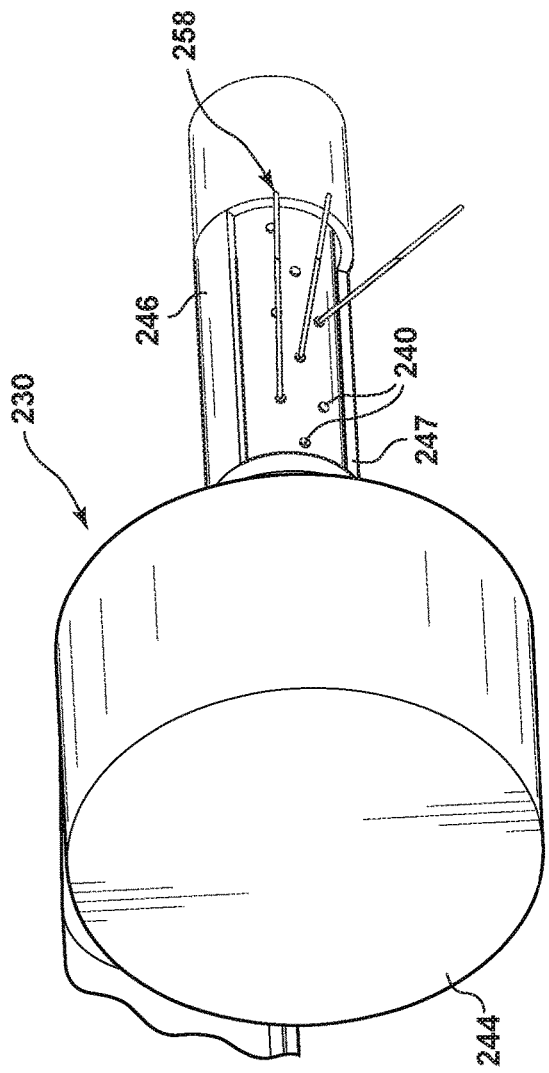
FIG. 19A
FIG. 19B

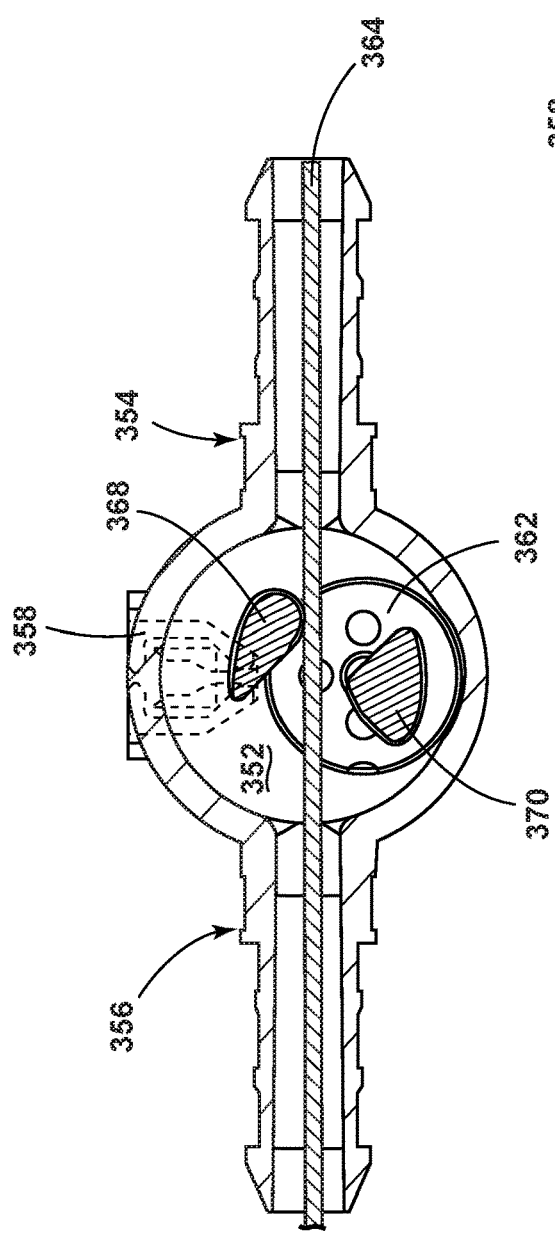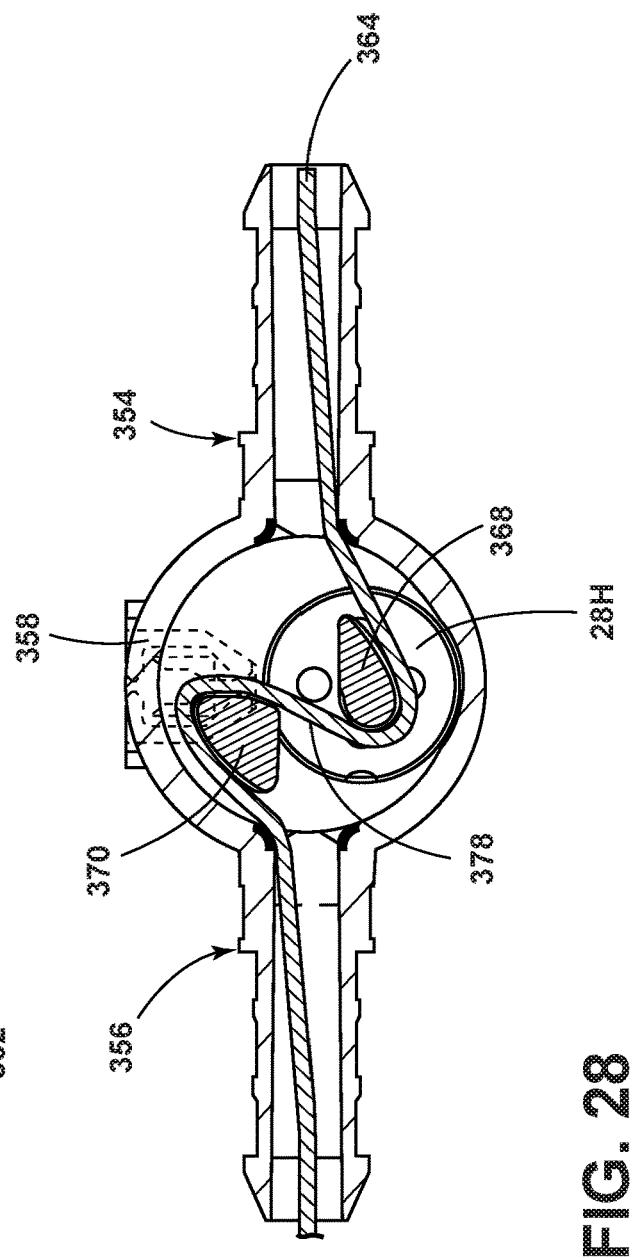
FIG. 27
FIG. 28

BRACKET AND MODULAR ASSEMBLY FOR FLUID SPRAY SYSTEM

BACKGROUND OF THE INVENTION

Various cleaning devices for vehicles are known, including nozzles that clean windows, headlights, and other vehicle surfaces. Exterior cameras and driver assistance sensors are increasing in popularity, and many vehicle models have these as standard or optional equipment. Due to the impact of environmental elements to these cameras and sensors, these systems can experience a loss in effectiveness. Said nozzles can be used to clean the lenses of these systems. Self-driving and autonomous vehicles, for example, which are also increasing in popularity and production, typically require an even greater number of cameras and sensors for navigation and guidance, driving and safety, and internal performance as compared to more traditional vehicles. In order to optimize the cleaning process, conventional washer nozzles are typically uniquely arranged on each different type of vehicle, and with respect to each structure to be cleaned, in order to properly direct fluid spray onto a particular region of a surface. Such unique arrangements have led to many developments in installation and post-installation solutions to accommodate the various brand, model, and/or structure-specific mounting options.

Unfortunately, however, conventional washer nozzles and related cleaning devices suffer from numerous drawbacks, including a requisite increase in manufacturing costs and labor, system weight, and number of individualized components needed (e.g. for new models/designs) associated with the solutions outlined above. These drawbacks are especially limiting with respect to cleaning systems for sensors, particularly those associated with self-driving and/or autonomous vehicular systems, which often require more effective cleaning due to the impact of environmental elements to connected systems that can lose effectiveness and, if uncorrected, lead to impairment of normal system function and/or vehicle operation. In newer vehicle designs requiring a greater number of cameras and sensors, such as for self-driving or autonomous vehicles, the need for serviceability, space constraints, and weight constraints make conventional nozzle washer nozzles and related cleaning devices undesirable and impractical.

BRIEF SUMMARY

An improved mounting arrangement for components of a fluid spray system is provided. A modular assembly for a fluid spray system of a vehicle is also provided. A combination bracket for mounting multiple components of a fluid spray system is also provided.

In one embodiment, a modular assembly for a fluid spray system of a vehicle includes a combination bracket having a sensor socket adapted to retainably receive a sensor to mount the sensor thereto and a retention point connectable to a support member of a vehicle, a spray nozzle coupleable with the combination bracket and adapted to spray fluid onto a sensor mounted to the combination bracket, the spray nozzle comprising an inlet and an outlet, and a check valve coupleable with the combination bracket and connectable to a fluid conduit and adapted to deliver fluid from the fluid conduit to the inlet of the spray nozzle.

In certain embodiments, the combination bracket establishes mounted positions of the sensor and the spray nozzle, and in their respective mounted positions, the spray nozzle is positioned to spray cleaning fluid onto the sensor.

In certain embodiments, the combination bracket establishes mounted positions of the spray nozzle and check valve, and in their respective mounted positions, the spray nozzle is in fluid communication with the check valve such that cleaning fluid that issues from an outlet of the check valve flows into an inlet of the spray nozzle.

In certain embodiments, the combination bracket includes a nozzle socket adapted to retainably receive the spray nozzle to mount the spray nozzle thereto.

In certain embodiments, the spray nozzle is adapted to produce a spray of cleaning fluid that issues from the outlet along a first direction, and wherein the sensor socket is spaced from the nozzle socket along the first direction.

In certain embodiments, a snap-lock receiver is provided on one of the nozzle socket and the spray nozzle and a snap-lock element is provided on the other one of the nozzle socket and the spray nozzle, the snap-lock element engageable with the snap-lock receiver to retain the spray nozzle in a mounted position on the combination bracket.

In certain embodiments, the check valve is integrated with the spray nozzle and mountable on the combination bracket via the insertion of the spray nozzle in the nozzle socket.

In certain embodiments, the check valve or at least one component thereof is integral with the combination bracket.

In certain embodiments, the check valve comprises a valve housing and a valve body, and the valve housing is integrated with the combination bracket and adapted to retainably receive the valve body to mount the valve body to the combination bracket.

In certain embodiments, the spray nozzle or at least one component thereof is integral with the combination bracket.

In certain embodiments, the spray nozzle comprises an elongated tubular spray tube comprising the inlet and the outlet on opposing ends of the spray tube, and component of the check valve are insertable into the inlet of the spray tube, with the spray tube forming a valve housing of the check valve.

In certain embodiments, the spray nozzle comprises a static fan spray nozzle, the outlet comprising a fan-producing outlet configured to produce a static fan spray pattern.

In certain embodiments, the spray nozzle comprises a jet spray nozzle comprising a nozzle body and a jet insert inserted into the nozzle body and defining the outlet, the outlet comprising a jet-producing outlet configured to produce a static jet spray pattern.

In certain embodiments, the spray nozzle comprises an oscillating fan spray nozzle comprising a nozzle body, a spherical body inserted into the nozzle body and supporting a spray-building chip, the chip defining the outlet and configured to generate an oscillating fan jet.

In certain embodiments, the spray nozzle comprises a combination spray nozzle comprising a nozzle body and a spray-building chip inserted into the nozzle body, the chip defining the outlet, the outlet comprising a fan jet exit opening, the chip further defining at least one other outlet, the at least one other outlet comprising a point jet exit opening.

In certain embodiments, the spray nozzle comprises an articulating spray nozzle having a housing having the inlet, a nozzle core rotatably coupled to the housing, the nozzle core comprising a sprayer shaft that defines the outlet and is adapted for passage of fluid from the housing through the outlet, a vane coupled to the sprayer shaft and adapted to receive fluid from the inlet to rotationally bias the nozzle core and radially orient the outlet to an activated position, and means for rotationally biasing the nozzle core to radially orient the outlet to a home position different than the activated position.

In certain embodiments, the spray nozzle comprises a dual media spray nozzle having an inlet portion having the inlet, the inlet comprising a first media inlet, and at least one other inlet, the at least one other inlet comprising a second media inlet separate from the first media inlet, and a spray element having the outlet, the outlet comprising a first media outlet in communication with the first media inlet, and at least one other outlet, the at least one other outlet comprising a second media outlet in communication with the second media inlet.

In certain embodiments, the spray nozzle comprises a telescoping spray nozzle comprising a housing, a piston arranged within the housing and configured to telescope relative to the housing between an inactive position and an active position; wherein the outlet is moveable with the piston.

In certain embodiments, the spray nozzle comprises a heatable spray nozzle comprising a nozzle body defining a fluid chamber and a heating line within the fluid chamber.

In certain embodiments, the spray nozzle is integrated with an electronic check valve, the spray nozzle and electronic check valve mountable as one assembly on the combination bracket.

In certain embodiments, the spray nozzle is adapted to spray fluid in a spray pattern comprising at least one of: a static fan spray; a static jet spray; an oscillating fan spray; and a combination jet and fan spray.

In certain embodiments, a plurality of spray nozzles are coupleable with the combination bracket and adapted to spray fluid onto the sensor. Optionally, the plurality of spray nozzles comprise at least a first spray nozzle adapted to spray fluid in a first spray pattern and a second spray nozzle adapted to spray fluid in a second spray pattern that is different than the first spray pattern.

In certain embodiments, the check valve comprises a valve stem having at least one orifice, an elastically deformable sleeve disposed about the valve stem to selectively seal the at least one orifice, with the sleeve interfering with the passage of fluid through the spray nozzle by movement to seal or unseal the at least one orifice.

In certain embodiments, the check valve comprises a solenoid actuator, a valve body comprising a valve seat, and a flexible pilot-operated diaphragm moveable into and out of engagement with the valve seat.

In certain embodiments, the sensor socket comprises a receiving element, and the sensor housing is mountable to the receiving element via a snap-fit engagement.

In certain embodiments, the receiving element comprises a plurality of snap-lock webs removably locking the sensor housing in the sensor socket.

In certain embodiments, the combination bracket comprises a one-piece body made of a plastic material.

In certain embodiments, the combination bracket comprises an electric heating means, which is provided for heating the cleaning fluid sprayed onto the sensor.

In certain embodiments, the combination bracket comprises at least one power connection, the power connection being connectable to a power source, at least one of the sensor and the check valve being electrically connectable with the power connection to be supplied with power from the power source.

In certain embodiments, the combination bracket comprises a valve receiving portion adapted to retainably receive the check valve to mount the check valve thereto, the check valve being separate from the spray nozzle.

In certain embodiments, the modular assembly includes a fluid accessory coupleable with the combination bracket, the fluid accessory comprising a filter media adapted to filter the fluid. Optionally, the check valve is integrated with the fluid accessory.

In another embodiment, a modular assembly for a fluid spray system of a vehicle includes a sensor comprising a sensor housing, a spray nozzle connectable to at least one fluid conduit and comprising an outlet, a check valve, and a combination bracket on which the spray nozzle, check valve, and sensor are mountable. The combination bracket includes a sensor socket in which the sensor housing is inserted to establish a mounted position of the sensor on the combination bracket, a nozzle socket in which at least the spray nozzle is inserted to establish a mounted position of the spray nozzle on the combination bracket, and at least one retention point connectable to a support member of a vehicle. In their respective mounted positions, the spray nozzle is positioned to spray cleaning fluid onto the sensor.

In one embodiment, the combination bracket includes a first socket adapted to receive a sensor to establish a mounted position of the sensor, a second socket adapted to receive a second component to establish a mounted position of the second component, wherein the second component is at least one of a spray nozzle and a check valve, and at least one retention point connectable to a support member of a vehicle.

In certain embodiments, the first socket comprises a receiving element adapted to establish the mounted position of the sensor via a snap-fit engagement, wherein the receiving element comprises a plurality of snap-lock webs.

In certain embodiments, the second socket comprises a snap-fit member adapted to establish the mounted position of the second component via a snap-fit engagement, the snap-fit member comprising one of a snap-lock receiver and a snap-lock element.

In certain embodiments, the second socket comprises a spray tip integrally formed therewith, the spray tip adapted to produce a spray of cleaning fluid toward the first socket.

In certain embodiments, the first socket, the second socket, and the at least one retention point are integrally formed as a one-piece body made of a plastic material.

In certain embodiments, the combination bracket includes at least one power connection, the power connection being connectable to a power source.

These and other features and advantages of the present disclosure will become apparent from the following description of particular embodiments, when viewed in accordance with the accompanying drawings and appended claims.

DESCRIPTION OF THE DRAWINGS

In the drawings:

FIG. 10 is a top view of the modular assembly of FIG. 9, with the sensor not shown for clarity;

FIG. 11 is a partial perspective view of the modular assembly of FIG. 9, showing multiple sprayers of the modular assembly;

FIG. 19A is a partial perspective view of the articulating spray nozzle of FIG. 17 operating in a home position;

FIG. 19B is a partial perspective view of the articulating spray nozzle of FIG. 17 operating in an activated position;

FIG. 27 shows a sectional view of the spray nozzle of FIG. 26 taken along line A-A, and showing a heating line inserted into a fluid chamber and a rotary disk in a first rotary position;

FIG. 28 is a view similar to FIG. 27, showing the rotary disk turned to a second rotary position to deflect the heating line;

DETAILED DESCRIPTION OF THE INVENTION

Figure 1:
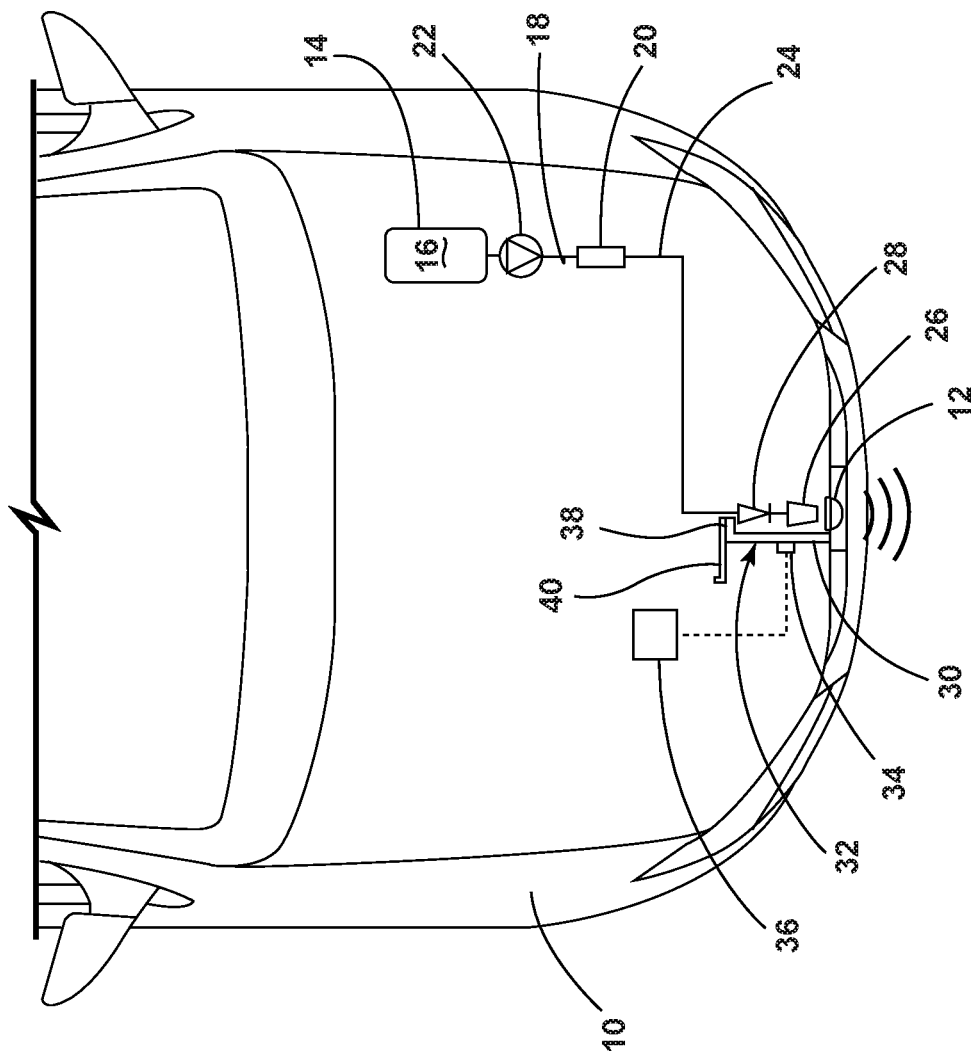
FIG. 1 is an environmental schematic view of a fluid spray system in accordance with the disclosed inventive concept in use on a vehicle, the system including a modular assembly comprising a sensor, spray nozzle, and check valve coupled together by a combination bracket.
Figure 3:
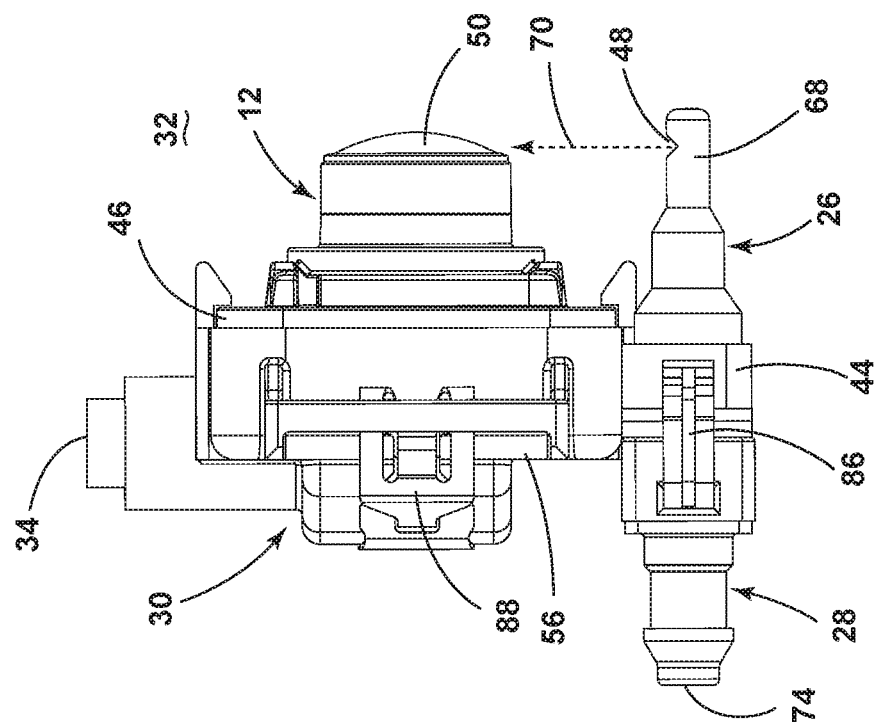
FIG. 3 is a side view of the modular assembly of FIG. 2.
Figure 2:
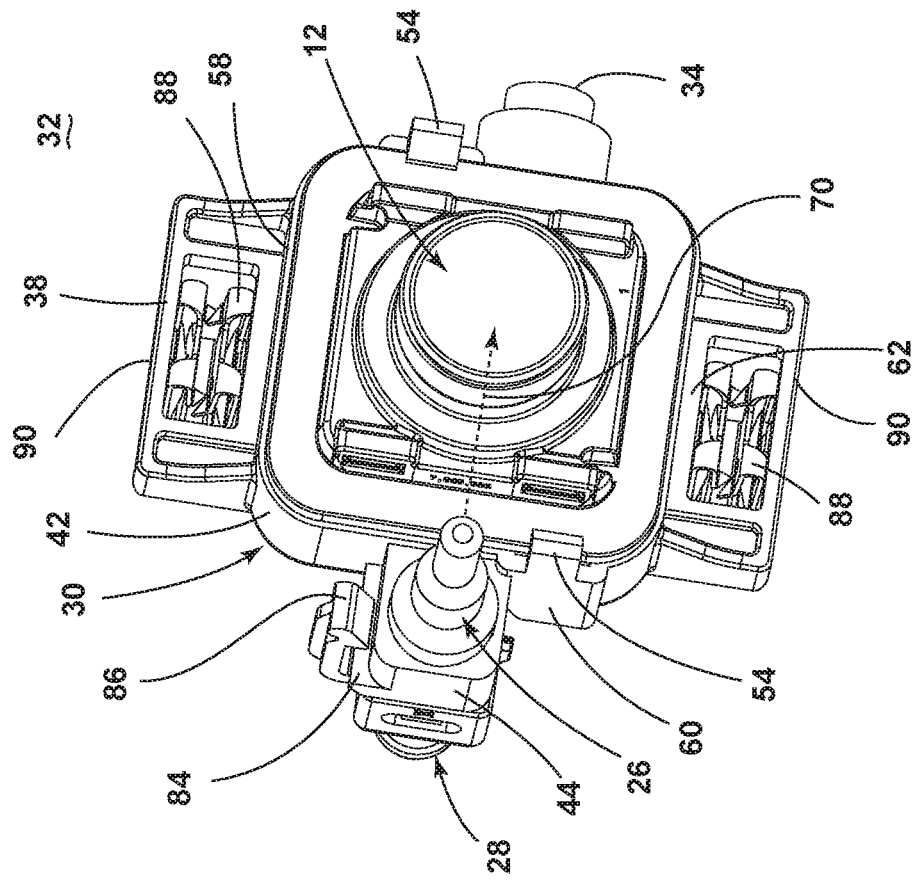
FIG. 2 is a perspective view of a modular assembly according to a first embodiment of the invention.

An improved nozzle/sensor mounting arrangement is provided, including a combination bracket facilitating the mounting of a sensor and a spray nozzle for cleaning the sensor. As will be appreciated from the description herein, the combination has multiple applications, but is suitable for installation on a vehicle. Moreover, the unique design and material construction of the combination bracket allows for increased sensor cleaning efficacy, decreased calibration and/or maintenance, increased usability and convenience, reduced number of parts, as well as other benefits that will be readily apparent to those of skill in the art in view of the embodiments shown and described herein.

In the following figures, the same reference numerals will be used to refer to the same components. In the following description, various operating parameters and components are described for different constructed embodiments. These specific parameters and components are included as examples and are not meant to be limiting.

In accordance with the disclosed inventive concept and with reference to FIG. 1 of the drawings, there is provided a vehicle 10 including a fluid spray system comprising at least one spray nozzle 26 located proximate to a surface requiring fluid, such as a sensor 12 of the vehicle 10. The vehicle 10 also includes a reservoir 14 for storing a supply of the fluid 16 and a pump 22 that pressurizes the system to allow for fluid delivery to the sensor 12. The pump 22 can be integrated into the reservoir 14 or situated at another location for conveying the fluid 16 from the reservoir 14 to the spray nozzle 26, and more particularly to an inlet of the spray nozzle 26. However, it is to be understood that the disclosed inventive concept may be similarly utilized for delivering fluid to a surface of any number of sensors or cameras on the vehicle 10 or to another surface the vehicle 10, such as a front windshield, a rear windshield, a headlight, or a headlamp.

It is noted that the components of the fluid spray system are schematically represented in FIG. 1, and are not necessarily drawn to scale relative to each other or the vehicle 10. It is also noted that the number and location of the components of the fluid spray system can vary from the illustrated embodiment, and it will be understood by those skilled in the art that the fluid spray system can use different numbers of components and in different locations in accordance with the principles of the present disclosure.

The terms "fluid," "fluid media," and "cleaning media" encompass fluid substances that are capable of flowing, including liquid, air, and mixtures thereof. The term "air" encompasses air and any other gas or mixtures of gasses, unless otherwise noted.

As used herein, the term "sensor" encompasses any sensor aiding the vehicle's operator in viewing the vehicle's environment, including at least one camera or other optical sensor. The sensor 12 can be provided at various locations on the vehicle, such as at the front, side, or rear of the vehicle 10, including at a hood, cowl screen, wiper arm, bumper, spoiler, or center high-mounted stop lamp. The sensor 12 may accordingly be a headlamp (H/L) sensor, front sensor, or rear sensor (i.e. a backup camera), among others.

The spray nozzle 26 can clean the sensor 12, including removing dirt or debris from the sensor 12 to improve sensor performance. In some embodiments, the spray nozzle 26 can more specifically clean a lens, cover, or housing of the sensor 12, including a lens, cover, or housing of a camera. While one spray nozzle 26 is shown in FIG. 1, it is understood that the fluid spray system can include multiple spray nozzles 26 configured to clean the sensor 12.

The spray nozzle 26 is adapted to produce a spray of cleaning fluid that issues from an outlet thereof. The spray nozzle outlet can be configured to produce various spray patterns, i.e. a static fan spray, a static jet spray, etc. For example, the spray nozzle outlet can be molded, cut, or otherwise formed in a spray tip for a static fan spray. Alternatively, a spray-building element such as a chip or eyeball can be provided at the outlet for achieving other spray patterns, such as a jet spray, an oscillating fan spray or a combination jet and fan spray. Alternatively, instead of producing a spray of cleaning fluid, the outlet 48 can dispense a stream of cleaning fluid, or otherwise disburse cleaning fluid toward the sensor 12.

A check valve 28 controls the flow of cleaning fluid through the spray nozzle 26. The check valve 28 is configured for unidirectional flow into or through the spray nozzle 26 (e.g. in one direction from the pump 22 to the spray nozzle 26). Aside from this function, the check valve 28 is not particularly limited, and may comprise any components and/or configurations suitable for use in/as a check valve. The check valve 28 can be integrated with the spray nozzle 26, or connected thereto by a fluid hose or conduit (not shown).

Figures 4, 5:
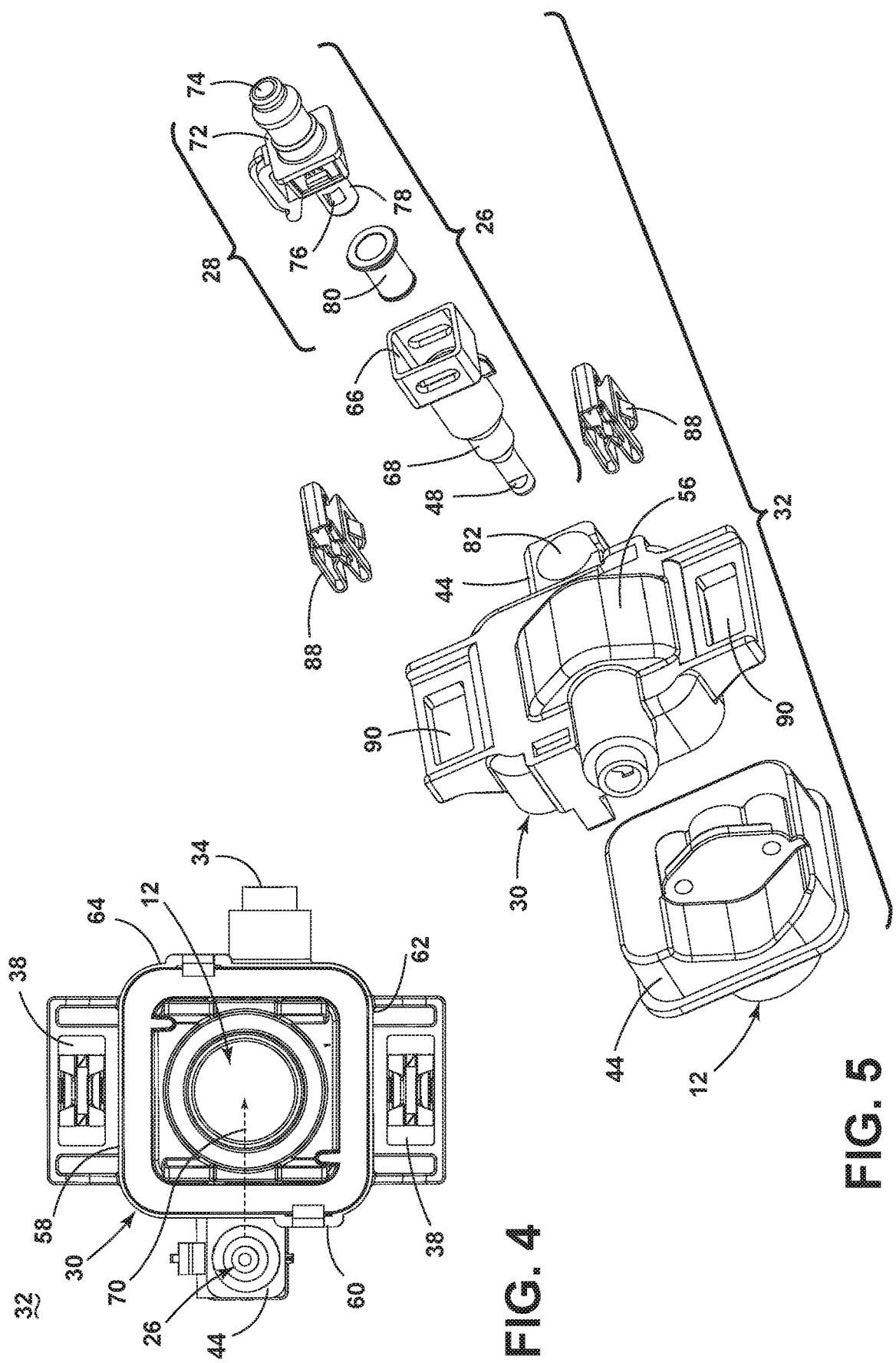
FIG. 4 is a front view of the modular assembly of FIG. 2.
FIG. 5 is an exploded view of the modular assembly of FIG. 2.

In certain embodiments, the check valve 28 comprises an elastically deformable sleeve configured to be disposed about a valve stem, with the sleeve acting as a gate to interfere with passage of fluid through the spray nozzle 26 by movement into or out of a valve seat. One example of a check valve with an elastically deformable sleeve is described below with respect to FIG. 5. It is to be appreciated that other styles/configurations of check valves are possible, including, but not limited to, a ball check valve, a diaphragm check valve, a duckbill check valve, a swing check valve, a lift-check valve, an umbrella check valve, etc.

Optionally, the fluid spray system can include a fluid accessory 20 for facilitating fluid 16 being applied onto the sensor 12. A first fluid hose or conduit 18 interconnects the pump 22 to a first end of the fluid accessory 20. The pump 22 is activated to cause the fluid 16 to be drawn from the reservoir 14 and into the fluid accessory 20 via the first conduit 18. A second fluid hose or conduit 24 interconnects a second end of the fluid accessory 20 with the valve 28. In the absence of the fluid accessory 20, one fluid hose or conduit can interconnect the pump 22 to the valve 28. In one embodiment, the fluid accessory 20 comprises a filter, as described in detail below with respect to FIGS. 32-35.

A combination bracket 30 can mount at least the sensor 12 and the spray nozzle 26 to the vehicle 10. In some embodiments, the combination bracket 30 can mount at least one other component of the fluid spray system to the vehicle 10. Examples of other components of the fluid spray system that can be mounted with the spray nozzle 26 via the combination bracket 30 include, but are not limited to, the fluid accessory 20 and the valve 28.

The sensor 12, spray nozzle 26, and combination bracket 30 can form a modular assembly 32, i.e. a module or unit, for easy installation and servicing. With the combination bracket 30, the sensor 12 and spray nozzle 26, and any other fluid spray system components mounted on the bracket 30, are simultaneously assembled on the vehicle 10 by attachment of the bracket 30 in the desired location for easy installation. Such installation can be completed by making necessary electrical and fluid connections, such as by connecting the sensor to a power source and by connecting the spray nozzle 26 to a fluid source, i.e. to the reservoir 14 via conduit 24. Likewise, the sensor 12 and spray nozzle 26, and any other fluid spray system components mounted on the bracket are simultaneously removable from the vehicle 10 by removal of the combination bracket 30, allowing for servicing, repair, or replacement of individual components of the modular unit, or the entire modular unit. Another advantage of the combination bracket is that the modular unit can be an aftermarket or replacement component for existing fluid spray systems on vehicles. The combination bracket 30 can retrofit with replacement components without having to replace the entire bracket 30 or all of the components mounted on the bracket 30. Yet another advantage of the combination bracket is that the use of one common bracket to mount multiple components of the fluid spray system can conserve space and reduce weight.

Optionally, the combination bracket 30 can be a universal or plug-and-play bracket configured to receive a variety of different spray nozzles, sensors, valves, etc. Hence, various desired combinations of components can be made, depending on the desired application or need.

The combination bracket 30 can comprise various structures for coupling the components (e.g. spray nozzle 26, sensor 12, check valve 28, etc.). In some embodiments, the combination bracket 30 can comprise a socket for receiving and holding one of the components. Other structures for receiving and holding the components on the bracket 30 are possible. Multiple sockets, each for holding a different component, can be provided. Such structures can be adapted for removably retaining the components, or for non-removably retraining the components. In some embodiments, one or more of the components, or a portion of one or more of the components, may be integrally formed with the combination bracket 30. In being integrally formed, the one or more of the spray nozzle 26, sensor 12, or check valve 28, or a portion of one or more of the spray nozzle 26, sensor 12, or check valve 28, can be integrated with or integral to the combination bracket 30. Regardless of how the various components are coupleable with the bracket 30, the bracket 30 establishes mounted positions of the spray nozzle 26 and sensor 12, and in their respective mounted positions, the spray nozzle 26 can be positioned to spray cleaning fluid onto the sensor 12.

Retention members on the combination bracket 30 and/or components can aid in retaining the components on the bracket 30 or otherwise coupling the components with the bracket 30. Suitable retention members include fasteners (e.g. threaded fasteners such as bolts, screws, etc., push fasteners, clamp fasteners, etc.) connectors (e.g. quick connectors, threaded connectors/connections, snap-fit connectors, etc.), couplings (e.g. snap-fit couplings, male-female couplings, press-couplings, etc.) clamps, adhesives, and the like, as well as various combinations thereof.

To install the combination bracket 30 on the vehicle 10, the combination bracket can be provided with at least one retention point 38 for retaining the bracket 30 on the vehicle 10. The retention point 38 is connectable to a support member 40 of the vehicle 10, such as on a chassis or frame of the vehicle 10. Various connection means can aid in connecting the bracket 30 with the support member 40 at the retention point. Suitable connection means include fasteners (e.g. threaded fasteners such as bolts, screws, etc., push fasteners, clamp fasteners, etc.) connectors (e.g. quick connectors, threaded connectors/connections, snap-fit connectors, etc.), couplings (e.g. snap-fit couplings, male-female couplings, press-couplings, etc.) clamps, adhesives, and the like, as well as various combinations thereof. The retention point 38 and connection means can be configured to fixedly or adjustably mount the combination bracket 30 on the support member 40.

The modular assembly 32 can be mounted in various locations on the vehicle 10. For example, the modular assembly 32 can be hood mounted, under hood mounted, cowl screen mounted, or wiper arm mounted. In another example, the modular assembly 32 can be integrated in or mounted on a rear end spoiler or a center high-mounted stop lamp (CHMSL). Portions of the modular assembly 32 can be flush with, or otherwise form a contiguous or continuous surface with, the vehicle 10. In particular, portions of the sensor 12 and/or nozzle 26 can be exposed and define a Class A surface of the vehicle 10.

The combination bracket 30 can include at least one power connection 34, the power connection 34 being connectable to a power source 36 of the vehicle 10. The sensor 12 and/or the valve 28 can be electrically coupled with the power connection 34 to be supplied with power from the power source 36 of the vehicle 10. In one embodiment, the power connection 34 can be an electrical socket and can be connected with a suitable plug and conductor (illustrated in FIG. 1 by a dotted line) in operative electrical connection with the power source 36 of the vehicle 10. In an alternative embodiment, the power connection 34 can be an electrical plug connectable with a suitable socket and conductor. In another alternative embodiment, one or more of the components (e.g. spray nozzle 26, sensor 12, check valve 28, etc.) on the bracket 30 can have an individual power connection.

In some embodiments one or more of the components can be removable from the combination bracket 30 without affecting the connections, including electrical or fluid connections, to other components mounted on the bracket 30. For example, in one embodiment the sensor 12 can be removed from the bracket 30 without removing the spray nozzle 26 and without disconnecting the spray nozzle 26 from fluid communication with the reservoir 14. Likewise, the spray nozzle 26 can be removed from the bracket 30 without removing the sensor 12 from the sensor socket and without disconnecting any electrical connections to the sensor 12.

The fluid-bearing components (e.g. the reservoir 14, conduit 18, fluid accessory 20, pump 22, conduit 24, spray nozzle 26) of the fluid spray system are connectable to establish a fluid flow path from the reservoir 14 to the spray nozzle 26, which delivers cleaning fluid to the sensor 12 via an outlet of the spray nozzle 26. Further, in some embodiments, the combination bracket 30 may define a portion of the fluid flow path from the reservoir 14 to the spray nozzle 26. Various connection means can aid in connecting the fluid-bearing components with each other to establish the fluid flow path. For example, one or more quick connectors can be used to quickly and simply connect one fluid-bearing component of the fluid spray system to another. Numerous quick connect couplings can be provided to make the necessary connections to establish continuous flow paths throughout the system. For example, a quick connector can be provided to connect the spray nozzle 26 and/or valve 28 with a source of fluid media, i.e. the reservoir 14. In one configuration, the quick connector can comprise a female connector configured to receive a male connector, and a locking member slidable in a transverse direction to lock the connectors together, as disclosed in European Application No. 20290026.2, filed Feb. 28, 2020, the complete disclosure of which is incorporated herein by reference. Yet another configurations for the quick connector are possible, such as, but not limited to, those described in U.S. Patent Application Publication No. 2017/0146173, published May 25, 2017 and U.S. Patent Application Publication No. 2019/0234547, published Aug. 1, 2019, the complete disclosures of which are incorporated herein by reference. The quick connector may also take on forms different from what is disclosed in the aforementioned references.

In any embodiment of the combination bracket 30 disposed herein, the combination bracket 30 can be a one-piece body made of a plastic material, and may be manufactured, for example, via injection molding or additive manufacturing, e.g. 3-D printing. In one example, the bracket 30 is a plastic injection molded structure. In another example, the bracket 30 is a 3D printed structure having multiple layers of plastic material deposited by an additive manufacturing machine. It is to be appreciated that other materials and manufacturing methods for the combination bracket 30 are possible, including a metal bracket manufactured by stamping, casting, etc.

In some embodiments, the combination bracket can include a heat sink positioned to transfer heat generated by the sensor 12 away from the combination bracket. The heat sink can comprise any component arranged to dissipate heat, including, but not limited to a thermally conductive material. In one embodiment, the combination bracket can comprise aluminum fins.

In some embodiments, the combination bracket can include an electric heating means, which is provided for heating the cleaning fluid sprayed onto the sensor 12. It is understood that the modular assembly 32 according to any embodiment described herein can incorporate a heating line or other suitable heating means for heating the cleaning fluid sprayed onto the sensor 12. In one embodiment, the spray nozzle comprises a heating line, as described in detail below with respect to FIGS. 26-28. In another embodiment, an electric heating means can be integrated with the check valve.

FIGS. 2-5 show a first embodiment of the modular assembly from FIG. 1, where like elements are referred to with the same reference numerals. The modular assembly 32 includes sensor 12, spray nozzle 26 connectable to at least one fluid conduit and comprising an outlet opening 48, check valve 28, which is integrated with the spray nozzle 26 as described in further detail below, and combination bracket 30 on which the spray nozzle 26, check valve 28, and sensor 12 are mountable. The combination bracket 30 is mountable to a vehicle, such as vehicle 10 of FIG. 1. The integrated spray nozzle 26 and check valve 28 is connectable with the pump 22 (FIG. 1) of the fluid spray system via conduit 24.

The combination bracket 30 can comprise a plurality of sockets for receiving and holding the components, including one or more of a sensor socket 42 in which the sensor 12 is inserted to establish a mounted position of the sensor 12 on the combination bracket 30 and a nozzle socket 44 in which at least the spray nozzle 26 is inserted to establish a mounted position of the spray nozzle 26 on the combination bracket 30. In their respective mounted positions, the spray nozzle 26 can be positioned to spray cleaning fluid onto the sensor 12. Other structures for receiving and holding the components on the bracket 30 are possible.

The sensor 12 can comprise a sensor housing 46 and a sensor lens or cover 50 mounted on the sensor housing 46. In their respective mounted positions, the spray nozzle 26 and sensor 12 are positioned such that the outlet opening 48 of the spray nozzle 26 can dispense cleaning fluid onto the cover 50 and/or housing 46 of the sensor 12.

Multiple walls 56-64 can define a generally rectilinear sensor socket 42, including a base wall 56 and four side walls 58, 60, 62, 64 extending from the base wall 56 to define an opening of the socket 42 into which the sensor 12 is insertable. More specifically, the sensor housing 46 can be insertable into the socket 42 through the opening thereof, with the sensor cover 50 at least partially exposed, i.e. so that the sensor's field of view is not obstructed by the socket 42 or other portion of the bracket 30.

The sensor socket 42 comprises a receiving element, and the sensor housing 46 can be mountable to the receiving element via a snap-fit engagement. In the embodiment shown, the receiving element comprises a plurality of snap-lock webs 54 removably locking the sensor housing 46 in the sensor socket 42. The snap-lock webs 54 can extend from opposing sides 60, 64 of the sensor socket 42 to engage the sensor housing 46 on multiple sides thereof.

The spray nozzle 26 of this embodiment is a removable nozzle integrated with the check valve 28. With an integrated spray nozzle 26 and check valve 28, it is understood that the mounting of the spray nozzle 26 to the combination bracket 30 also accomplishes the mounting of the check valve 28 to the combination bracket, and vice versa. In the embodiment illustrated, the check valve 28 is mountable on the combination bracket 30 via the insertion of the spray nozzle 26 into the nozzle socket 44.

The spray nozzle 26 includes an inlet 66 and an outlet or outlet opening 48. The inlet 66 and outlet 48 can be disposed on opposing ends of a spray tube 68 extending through the nozzle socket 44 in the mounted position of the spray nozzle 26. The spray tube 68 can have any shape and be provided in any form, including, but not limited to, a tube 68 having an elongated tip in which the outlet 48 is formed and which is configured to project beyond the nozzle socket 44. The outlet 48 can have any shape and be provided in any form, including a slot, slit, opening, etc., in the spray tip.

The spray nozzle 26 is adapted to produce a spray of cleaning fluid that issues from the outlet opening 48 along a first direction 70. The first direction 70 can optionally be generally radially with respect to the longitudinal axis of the tube 68. Alternatively, instead of producing a spray of cleaning fluid, the outlet 48 can dispense a stream of cleaning fluid, or otherwise disburse cleaning fluid toward the sensor 12, generally along the first direction 70.

The check valve 28 provides unidirectional flow of fluid through the spay nozzle 26, i.e., preventing backflow. In the present embodiment, the check valve 28 comprises a valve body 72 having a valve inlet 74 and at least one valve outlet or orifice 76. A fluid passage formed in the valve body 72 provides a pathway for cleaning fluid from the inlet 74 to the orifice 76. The valve body 72 can have any shape and be provided in any form, including, but not limited to, an elongated tubular shape as illustrated.

The end of the spray tube 68 comprising the inlet 66 can form a valve housing for the check valve 28 to integrate the check valve 28 with the spray nozzle 26. The valve housing or inlet end of tube 68 can receive the valve body 72 and help direct fluid from the valve outlet 76 to the nozzle outlet 48.

The valve body 72 include a valve stem 78 having the at least one orifice 76 and configured to project into the valve housing portion of the spray tube 68. An elastically deformable sleeve 80 is configured to be disposed about the valve stem 78 to selectively seal the orifice 76, with the sleeve 80 acting as a gate to interfere with passage of fluid through the spray nozzle 26 by movement into or out of a valve seat to seal or unseal the orifice 76. When unsealed, cleaning fluid flows from the orifice 76 through the spray tube 68.

The nozzle socket 44 can be disposed adjacent to the sensor socket 42 such that the nozzle 26 is proximate to the sensor 12. In embodiments where the spray nozzle 26 is adapted to produce a spray of cleaning fluid that issues from the outlet opening 48 along first direction 70, and the sensor socket 42 can be spaced from the nozzle socket 44 along the first direction 70.

The nozzle socket 44 can extend outwardly from one of the side walls 60 of the sensor socket 42 and can comprise a through hole 82 for insertion of spray nozzle 26, with the spray tube 68 extending in one direction to position the outlet 48 distally of the through hole 82 and the valve body 72 extending in opposite direction to position valve inlet 74 proximally of the through hole 82.

A snap-lock receiver 84 can be provided on the nozzle socket 44 and a snap-lock element 86, such as a snap-lock web, can be provided at any suitable location on the integrated spray nozzle 26 and check valve 28. In the present embodiment, the snap-lock element 86 is provided on the valve body 72. The snap-lock element 86 is engageable with the snap-lock receiver 84 to retain the integrated spray nozzle 26 and check valve 28 in the mounted position on the combination bracket 30.

The combination bracket 30 of the present embodiment can be fixed to a vehicle support structure, such as support member 40 of FIG. 1, of at a pair of retention points 38. The retention points 38 of the present embodiment comprise retention clips 88 that are compressible, and are configured to expand outwardly to retain the combination bracket 30 on vehicle support member 40 (FIG. 1) and inhibit disengagement. In one embodiment, the clips 88 can be hooked on an opening edge of a mounting hole in vehicle support member 40 so that the combination bracket 30 is retained adjacent the vehicle support member 40. The combination bracket 30 can include clip mounts 90 for the retention clips 88. The clip mounts 90 can be provided on or adjacent the sensor socket 42 or the nozzle socket 44. In the embodiment shown, a pair of outwardly extending clip mounts 90 adjacent opposing walls 58, 62 of the sensor socket 42 receive the retention clips 88.

The combination bracket 30 of the present embodiment can include power connection 34 at a side of the sensor socket 42, optionally opposite the nozzle socket 44. The power connection 34 can comprise a power socket connectable with a suitable plug and conductor (illustrated in FIG. 1 by a dotted line). The sensor 12 can be electrically coupled with the power connection 34 via insertion of the sensor 12 into the sensor socket 42. In other words, the sensor socket 42 can be configured to mechanically and electrically couple the sensor 12 by the action of inserting the sensor 12 into the socket 42. Alternatively, an electrical connection separate from the socket 42 can be provided for connecting the sensor 12 with the power connection 34 of the bracket 30.

Figure 6:
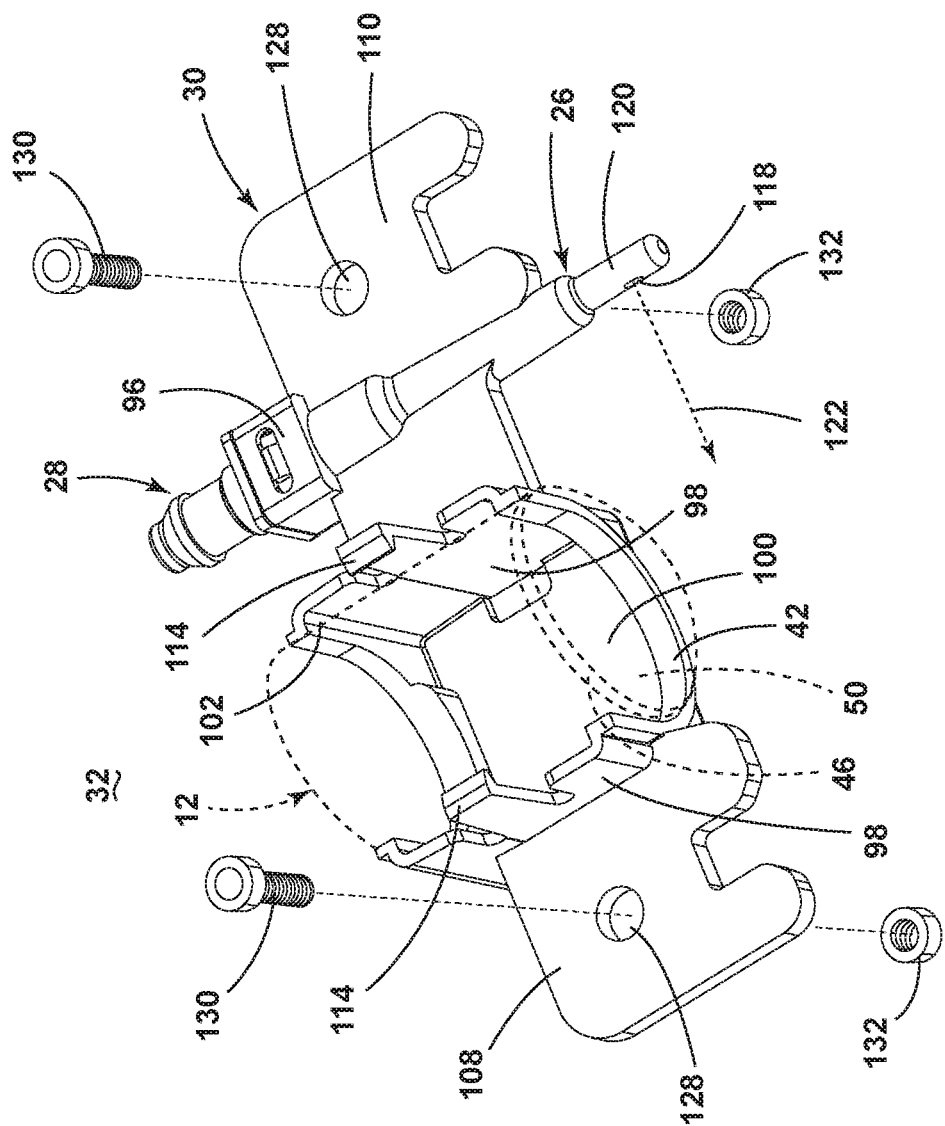
FIG. 6 is a partially exploded, front perspective view of a modular assembly according to a second embodiment of the invention.
Figure 7:
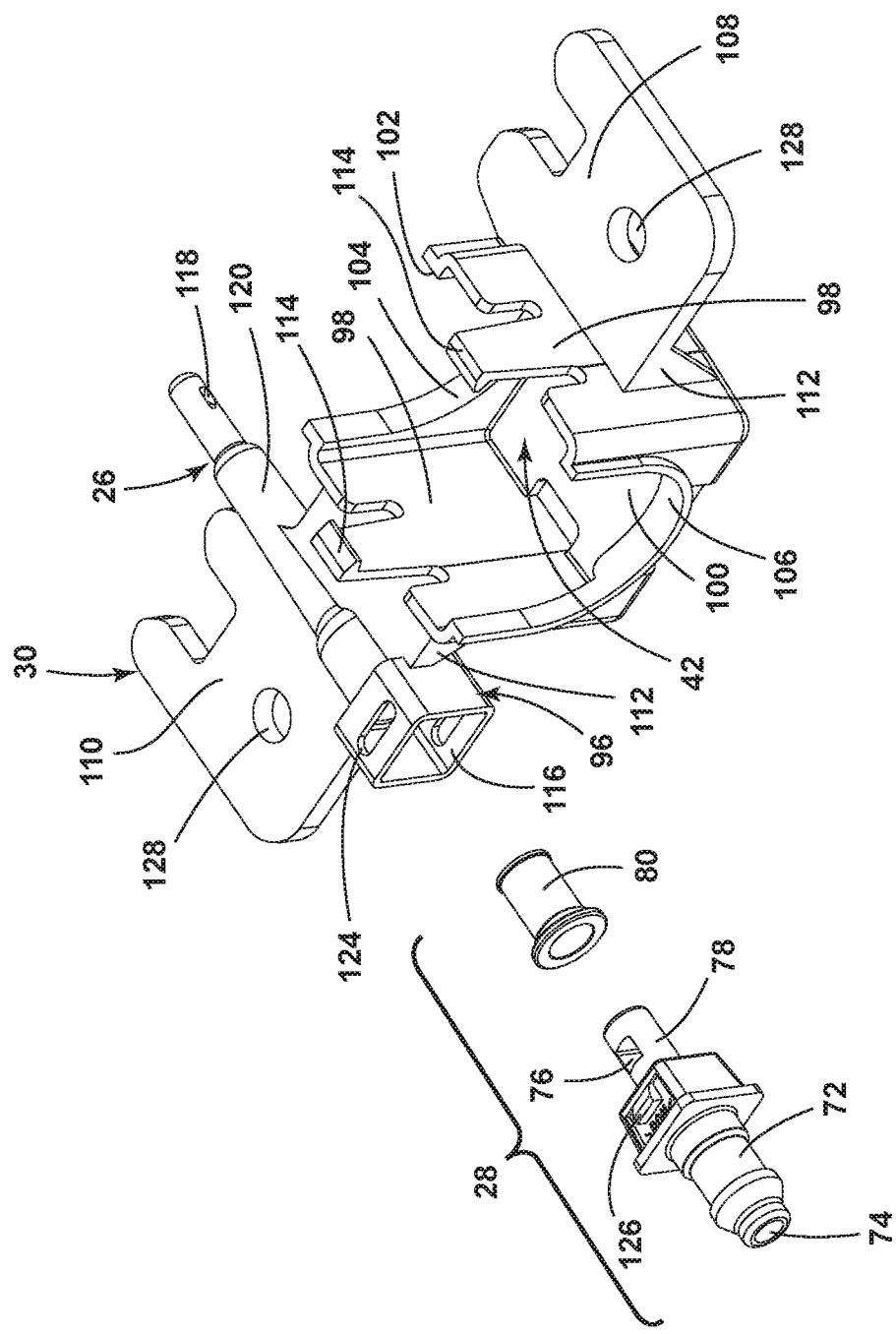
FIG. 7 is an exploded rear perspective view of the modular assembly of FIG. 6, with the sensor not shown for clarity.
Figure 8:
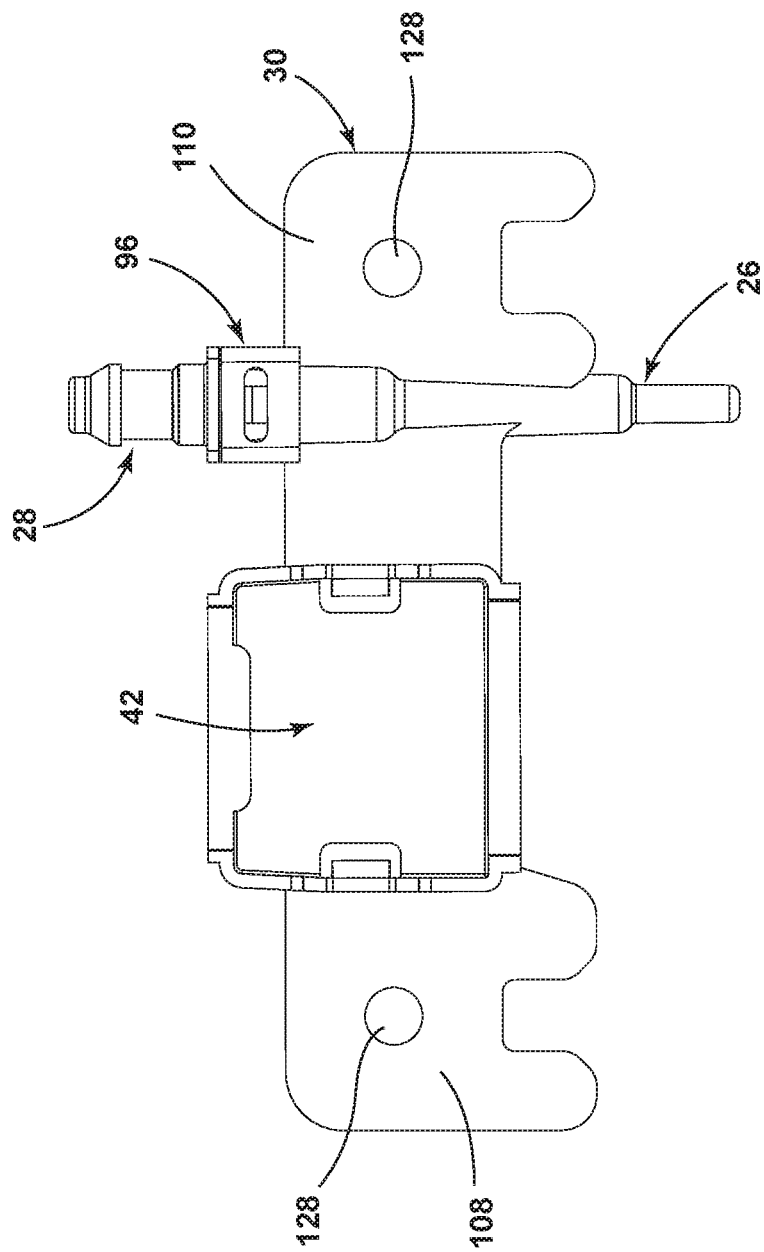
FIG. 8 is a top view of the modular assembly of FIG. 6, with the sensor not shown for clarity.

FIGS. 6-8 show a second embodiment of the modular assembly from FIG. 1, where like elements are referred to with the same reference numerals. The modular assembly 32 includes sensor 12 (shown in phantom line in FIG. 6 for clarity), spray nozzle 26, check valve 28, and combination bracket 30 to which the sensor 12, spray nozzle 26, and check valve 28 are coupleable. In the second embodiment, at least one component of the spray nozzle 26 and at least one component of the check valve 28 can be integral with the combination bracket 30. The combination bracket 30 is mountable to a vehicle, such as vehicle 10 of FIG. 1. In the present embodiment, the check valve 28 comprises the sleeve-configuration described for the first embodiment. Other configurations for the check valve 28 are possible.

The combination bracket 30 can comprise a receiving portion for receiving and holding at least one component, such as a sensor socket 42 in which the sensor 12 is inserted to establish a mounted position of the sensor 12 on the combination bracket 30. Other receiving structures are possible.

The combination bracket of the second embodiment includes a generally U-shaped sensor socket 42, including two spaced clamping walls 98 joined by a base wall 100, and which form an open top 102 and open sides 104, 106, for the insertion of the sensor 12. Flange plates 108, 110 extend outwardly from each of the clamping walls 98. Ribs 112 can extend between the outer surfaces of the clamping walls 98 to the underside of the flange plates 108, 110 to stiffen the bracket 30.

The sensor socket 42 comprises a receiving element, and the sensor housing 46 can be mountable to the receiving element via a snap-fit engagement. In the embodiment shown, the receiving element comprises a snap-lock webs 114 extending from the clamping walls 98 of the sensor socket 42 to engage the sensor housing 46 on multiple sides thereof. The sensor housing 46 can be insertable into the U-shaped socket 42 through the open top 102 thereof, with the snap-lock webs 114 removably locking the sensor housing 46 in the sensor socket 42 and with the sensor cover 50 at least partially exposed through one of the open sides 104, i.e. so that the sensor's field of view is not obstructed by the socket 42 or other portion of the bracket 30.

In the present embodiment, the combination bracket 30 itself does not comprise a power connection. Instead, the sensor 12 can comprise its own power connection (not shown), such as a plug or socket, configured to be connected with the power source 36 of the vehicle 10 (FIG. 1) to supply power to the sensor 12. One of the open sides 106 of the socket 42, such as the side opposing the sensor cover 50, can expose the power connection on the sensor 12 to be connected with a suitable conductor (illustrated in FIG. 1 by a dotted line) in operative electrical connection with the power source 36 of the vehicle 10.

The spray nozzle 26 of this embodiment is integrally formed with the combination bracket 30. The spray nozzle 26 includes an inlet opening 116 and an outlet opening 118. The inlet and outlet openings 118 can be disposed on opposing ends of a spray tip 120 integral to the combination bracket 30. The outlet opening 118 can have any shape and be provided in any form, including a slot, slit, opening, etc., in the integral tip 120. The spray tip 120 can have any shape and be provided in any form, including, but not limited to, an elongated tubular shape as illustrated. The spray tip 120 can be formed with one of the flange plates 110 that extend outwardly from clamping wall 98, with portions of the spray tip 120 extending proximally and distally of the flange plate 110.

The spray nozzle 26 is adapted to produce a spray of cleaning fluid that issues from the outlet 118 along a second direction 122. The second direction 122 can optionally be generally radially with respect to the longitudinal axis of the spray tip 120. Alternatively, instead of producing a spray of cleaning fluid, the outlet 118 can dispense a stream of cleaning fluid, or otherwise disburse cleaning fluid toward the sensor 12, generally along the second direction 122. The sensor socket 42 establishes a mounted position of the sensor 12 on the combination bracket 30. In its mounted position, the sensor 12 can be positioned to receive cleaning fluid sprayed by the integral spray tip 120. Other structures for receiving and holding the components on the bracket 30 are possible.

The spray tip 120 can be disposed adjacent to the sensor socket 42 such that the nozzle 26 is proximate to the sensor 12. In embodiments where the spray nozzle 26 is adapted to produce a spray of cleaning fluid that issues from the outlet 118 along second direction 122, and the sensor socket 42 can be spaced from the spray tip 120 along the second direction 122.

The check valve 28 of this embodiment is at least partially integrally formed with the combination bracket 30. The combination bracket 30 includes a valve housing 96 which can receive the valve body 72 and help direct fluid from the valve outlet 76 to the spray tip outlet 118. In the illustrated embodiment, the valve housing 96 can be integrated with the spray tip 120 at the inlet opening 116, on the proximal side of the flange plate 110. Other configurations for the integrated valve housing 96 are possible, including configurations in which the valve housing 96 is integrated with the combination bracket 30 and not integrated with the spray nozzle 26.

The valve housing 96 can receive the valve body 72 and help direct fluid from the valve outlet 76 to the nozzle outlet 48, for unidirectional flow of fluid from the spay nozzle 26, i.e., preventing backflow. The valve body 72 carrying the sleeve 80 is inserted into the valve housing 96 to establish a mounted position of these components of the check valve 28 on the combination bracket 30.

A snap-lock receiver 124 can be provided on the valve housing 96 and a snap-lock element 126, such as a snap-lock detent, can be provided at any suitable location on the valve body 72. The snap-lock element 126 is engageable with the snap-lock receiver 124 to retain the valve body 72, and the mounted sleeve 80, in the mounted position on the combination bracket 30.

The combination bracket 30 of the present embodiment can be fixed to a vehicle support structure, such as support member 40 of FIG. 1, of at a pair of retention points 38. The retention points 38 of the present embodiment comprise at least one hole 128 disposed in each flange plate 108, 110 for receiving a threaded bolt fastener 130, upon which a nut 132 can be engaged for securing the bracket to a vehicle support surface. Alternatively, fastener 130 may be a rivet, cotter pin, or the like.

FIGS. 9-12 show a third embodiment of the modular assembly from FIG. 1, where like elements are referred to with the same reference numerals. The modular assembly 32 includes sensor 12 (shown in phantom line in FIG. 9 for clarity), multiple spray nozzles 26, check valve 28, and combination bracket 30 on which the sensor 12, spray nozzle 26, and check valve 28 are coupleable. In the third embodiment, at least one component of the spray nozzle 26 and at least one component of the check valve 28 can be integral with the combination bracket 30. The combination bracket 30 is mountable to a vehicle, such as vehicle 10 of FIG. 1. The check valve 28 is connectable with the pump 22 (FIG. 1) of the fluid spray system via conduit 24 and controls the flow of fluid through the spray nozzles 26. In the present embodiment, the check valve 28 comprises the sleeve-configuration described for the first embodiment. Other configurations for the check valve 28 are possible.

The combination bracket 30 can comprise a receiving portion for receiving and holding at least one component, such as a sensor socket 42 in which the sensor 12 is inserted to establish a mounted position of the sensor 12 on the combination bracket 30. Other receiving structures are possible.

The sensor 12 can be removably mounted in the sensor socket 42. Multiple walls 140-148 can define a generally rectilinear sensor socket 42, including a base wall 140 and four side walls 142, 144, 146, 148 extending from the base wall 140 to define an opening of the socket 42 into which the sensor 12 is insertable. More specifically, the sensor 12 can be insertable into the socket 42 through the opening thereof, with the sensor 12 at least partially exposed, i.e. so that the sensor's field of view is not obstructed by the socket 42 or other portion of the bracket 30.

The sensor socket 42 comprises a receiving element, and the sensor 12 can be mountable to the receiving element via a snap-fit engagement. In the embodiment shown, the receiving element comprises a plurality of snap-lock webs 150 removably locking the sensor 12 in the sensor socket 42. The snap-lock webs 150 can extend from opposing sides 142, 146 of the sensor socket 42 to engage the sensor 12 on multiple sides thereof.

The combination bracket 30 can comprise at least one integrated nozzle housing 44 for the spray nozzles 26. The nozzle housing 44 can help direct fluid from the check valve 28 to the outlets of the spray nozzles 26. In at least some embodiments, the nozzle housing 44 can act as a manifold providing cleaning fluid to each of the spray nozzles 26, and with an inlet in fluid communication with the check valve 28.

The spray nozzles 26 of this embodiment can include at least one static fan spray nozzle 26F flanked by two jet spray nozzles 26J. The static fan spray nozzle 26F can be disposed generally at a midline or center of the sensor 12, and the jet spray nozzles 26J can be disposed laterally of the midline or center of the sensor 12, on either side of the static fan spray nozzle 26F.

The spray nozzles 26 can be removably or non-removably mounted in one common nozzle housing 44 to establish a mounted position of the spray nozzles 26 on the combination bracket 30. In their respective mounted positions, the spray nozzles 26 can be positioned to spray cleaning fluid onto the sensor 12. In an alternate embodiment, the spray nozzles 26 can be removably or non-removably in individual nozzle sockets on the combination bracket 30. Other structures for receiving and holding the spray nozzles 26 on the bracket 30 are possible.

The static fan spray nozzle 26F is configured to produce a static fan spray. The nozzle 26S includes a nozzle body 152 and a fan-producing outlet 154 in the nozzle body 152. A spray-building element, such as a chip 156, can be inserted into the nozzle body 152 and can define the fan-producing outlet 154 configured to produce the static fan spray pattern. For example, the chip 156 can comprise a central flow-through opening through which fluid flows and a plurality of channels extending outward from the central opening in a fan shape to define the fan-producing outlet 154. In an alternative embodiment, the fan-producing outlet 154 can be molded, cut, or otherwise formed in the nozzle body 152 to produce the static fan spray pattern.

The chip 156 can be fixed within the nozzle body 152 to direct the static fan spray in a predetermined orientation, or can be adjustably-mounted in the nozzle body 152 to adjust the orientation of the static fan spray. For example, the chip 156 can be rotationally mounted within the nozzle body 152, and rotating the chip 156 permits the orientation of the static fan spray to be adjusted.

The jet spray nozzle 26J is configured to produce a static jet spray. The nozzle 26J includes a nozzle body 158 and a jet-producing outlet 160. A spray-building element, such as a jet insert 162 (sometimes referred to as an eyeball), can be inserted into the nozzle body 158 and can define the jet-producing outlet 160 configured to produce the static jet spray pattern. While one jet insert 162 is shown in each nozzle body 158, in an alternative embodiment, one or more of the nozzles bodies 158 can be adapted to accommodate multiple jet inserts 162. In another alternative embodiment, instead of being defined by a jet insert, the jet-producing outlet 160 can be molded, cut, or otherwise formed in the nozzle body 158 to produce the static jet spray pattern.

The jet insert 162 can be fixed within the nozzle body 158 to direct the static jet spray in a predetermined orientation, or can be adjustably-mounted in the nozzle body 158 to adjust the orientation of the static jet spray. For example, the jet insert 162 can be rotationally mounted within the nozzle body 158, and rotating the jet insert 162 permits the orientation of the static jet spray to be adjusted.

The nozzle housing 44 can be elongated along one side wall 142 of the sensor socket 42 to position all three spray nozzles 26 proximate to the sensor 12. The nozzle bodies 152, 158 are configured to receive cleaning fluid from the check valve 28, and spray cleaning fluid outwardly from the chip 156 and jet inserts 162, respectively, toward the sensor 12. Optionally, the nozzle bodies 152, 158 can be integrally formed with the nozzle housing 44, or directly with the combination bracket 30 in the absence of a nozzle housing, with the chip 156 and jet inserts 162 inserted into appropriately-sized openings in the nozzle bodies 152, 158. Alternatively, the nozzle bodies 152, 158 can be formed separately, and inserted into appropriate nozzle body openings in the nozzle housing 44.

The check valve 28 of this embodiment is at least partially integrally formed with the combination bracket 30. The combination bracket 30 includes a valve housing 96 that can receive the valve body 72 and help direct fluid from the valve outlet 76 to the nozzle housing 44. The valve body 72 can be removably mounted in the valve housing 96, optionally with a snap lock as previously described.

Figure 12:
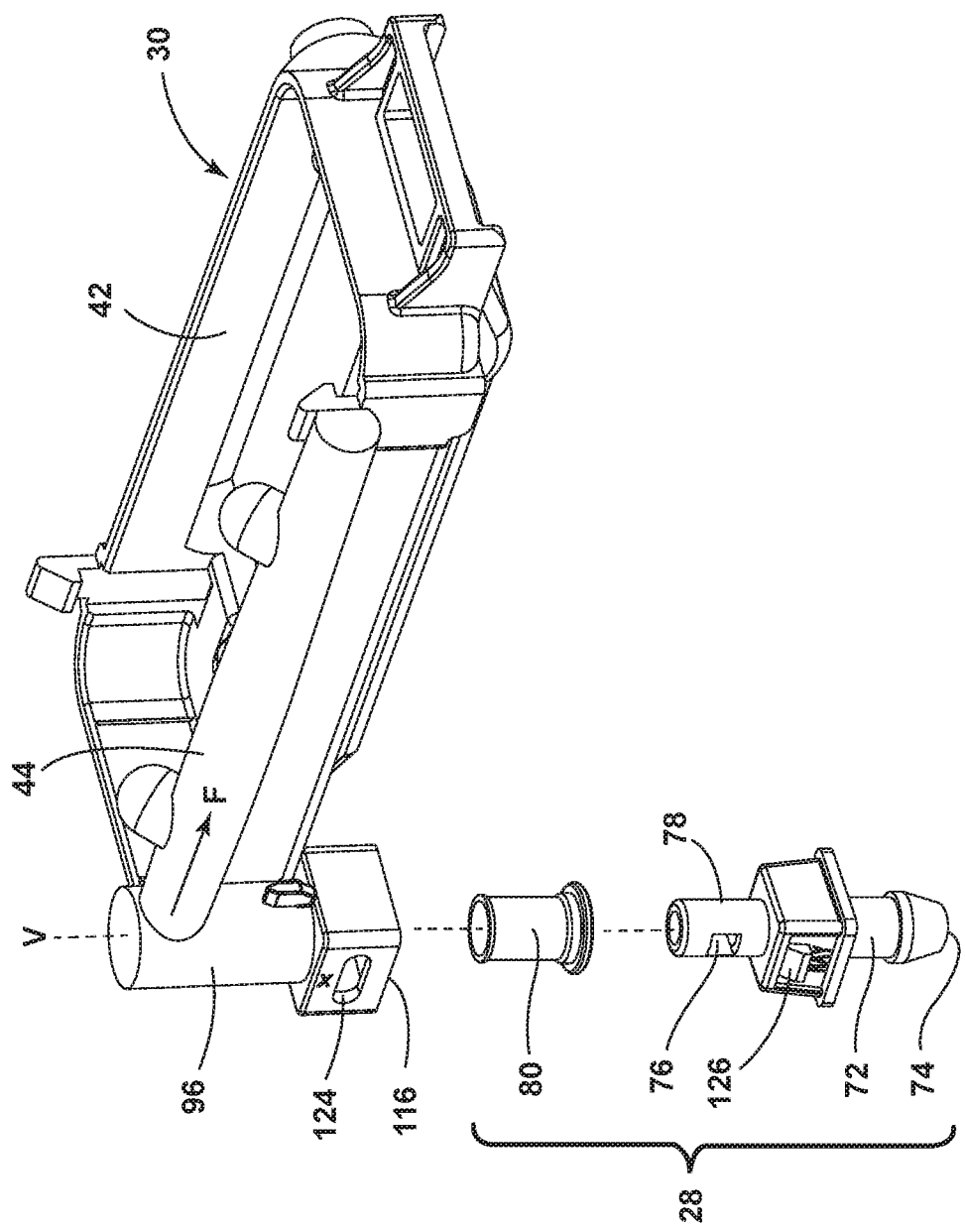
FIG. 12 is a rear perspective view of the modular assembly of FIG. 9, with the check valve shown exploded from the bracket and the sensor not shown for clarity.

In the illustrated embodiment, the valve housing 96 can be disposed at the inlet end of the nozzle housing 44, optionally configured such that a longitudinal axis V of the check valve 28 is perpendicular to a flow direction F of fluid from the check valve outlet to the spray nozzles 26. For example, as shown in FIG. 12, the nozzle housing 44 can extend generally orthogonally from an upper end of the valve housing 96. Other configurations for the integrated valve housing 96 are possible.

The combination bracket 30 of the present embodiment can be fixed to a vehicle support structure, such as support member 40 of FIG. 1, of at a pair of retention points 38. For example, the combination bracket 30 can include clip mounts 164 for compressible retention clips (not shown), such as clips 88 described for the first embodiment. The clip mounts 164 can be provided on or adjacent the sensor socket 42, on opposing walls 144, 148 of the sensor socket 42.

The embodiments of the modular assembly 32 of FIGS. 2-12 disclose various spray nozzles 26, combinations of spray nozzles 26, spray patterns, and combinations of spray patters. It is understood that the modular assembly 32 according to any embodiment described herein can incorporate other suitable spray nozzles, combinations of spray nozzles, spray patterns, and combinations of spray patters, with the combination bracket 30 being appropriately adapted to retain said spray nozzle(s) in a mounted position in which the spray nozzle(s) can clean a sensor. Some additional embodiments of spray nozzles for the combination bracket 30 are disclosed in FIGS. 13-31.

Figure 14:
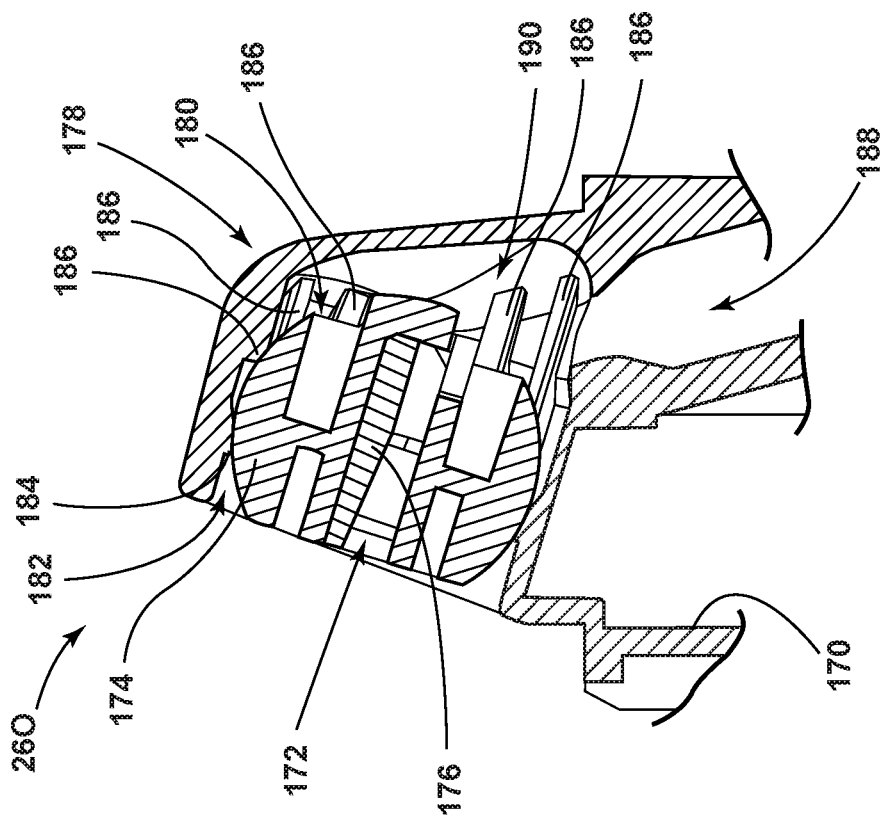
FIG. 14 shows the spray nozzle of FIG. 13 in longitudinal section in the region of a bearing head of the spray-building element.
Figure 13:
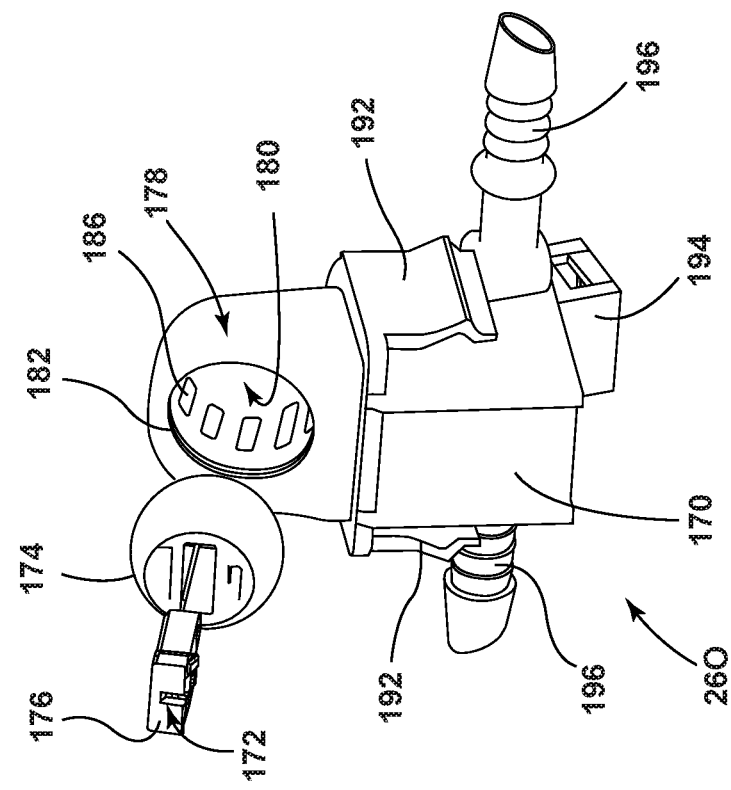
FIG. 13 is an exploded perspective view of an oscillating spray nozzle according to another embodiment comprising a nozzle body, a spherical body, and a spray-building element, such as a chip.

Referring to FIGS. 13-14, a spray nozzle 260 with a dynamic or oscillating fan spray pattern according to one embodiment is shown. One configuration for the dynamic/oscillating fan spray nozzle 260 is described in U.S. Pat. No. 8,186,608, issued May 29, 2012, the complete disclosure of which is incorporated herein by reference. The oscillating fan spray nozzle may also take on forms different from what is disclosed in the aforementioned reference.

The spray nozzle 260 includes a nozzle body 170 and an oscillating fan-producing outlet 172 in the nozzle body 170. A spherical body 174, which supports a spray-building element, such as a chip 176, can be inserted into the nozzle body 170, with the chip 176 defining the outlet 172. The chip 176 is configured to generate an oscillating fan jet.

The nozzle body 170 has a dome-like bearing head 178 having a receiving space 180 that is closed to the outside except for a circular window opening 182. Disposed in said receiving space 180 are a circumferential annular shoulder 184 provided on the window opening 182 and a number of resistance projections 186 in spaced relation to window opening 182 and which are arranged evenly over the circumferential direction on a side wall bounding the receiving space 180. The spherical body 174 is inserted into the receiving space 180 to be rotatably and pivotably held in bearing head 178 between the shoulder 184 and the projections 186.

The resistance projections 186 can also serve to fluidically stabilize cleaning fluid. A fluid inlet space 188 of the nozzle body 170, which can be in fluid communication with an outlet of the check valve 28 (FIG. 1), communicates with a flow expansion chamber 190 formed as a subregion of the receiving space 180. The resistance projections 186 are disposed in the flow expansion chamber 190 and swirl the fluid flowing in from fluid inlet space 188, thereby inducing a homogenization of the flow in the flow expansion chamber 190, before the fluid passes through the chip 176. An oscillating fan-like stream can be reliably generated as a result.

Latching tongues 192 in the nozzle body 170 are adapted to fix nozzle body 170 in a nozzle socket or other suitable supporting structure on the combination bracket 30. Other structures for coupling the spray nozzle 260 with the combination bracket 30 are possible, including removable or non-removable mountings, and configurations where a portion of the spray nozzle 260 is integrally formed with the combination bracket 30.

In some embodiments, the nozzle body 170 includes a valve receiver 194 into which the check valve 28 (FIG. 1) can be inserted. Other structures for establishing a fluid connection to the check valve 28 are possible.

Figure 9:
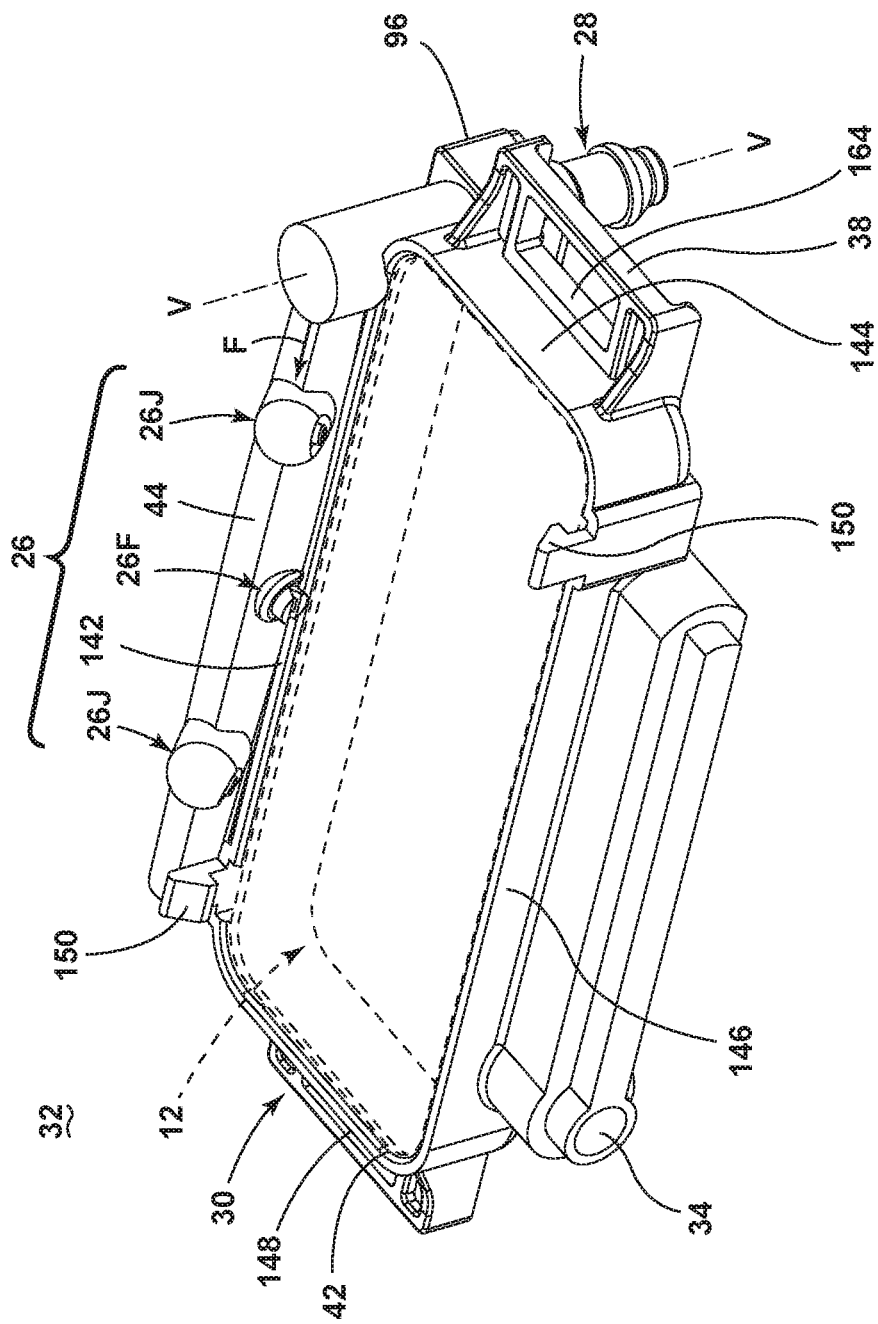
FIG. 9 is a perspective view of a modular assembly according to a third embodiment of the invention.

In some embodiments, one or more connection nozzles 196 are formed on the nozzle body 170 to establish a fluid connection to one or more other spray nozzle, such as in a case where the combination bracket 30 supports multiple spray nozzles like the third embodiment of FIG. 9.

Figure 16:
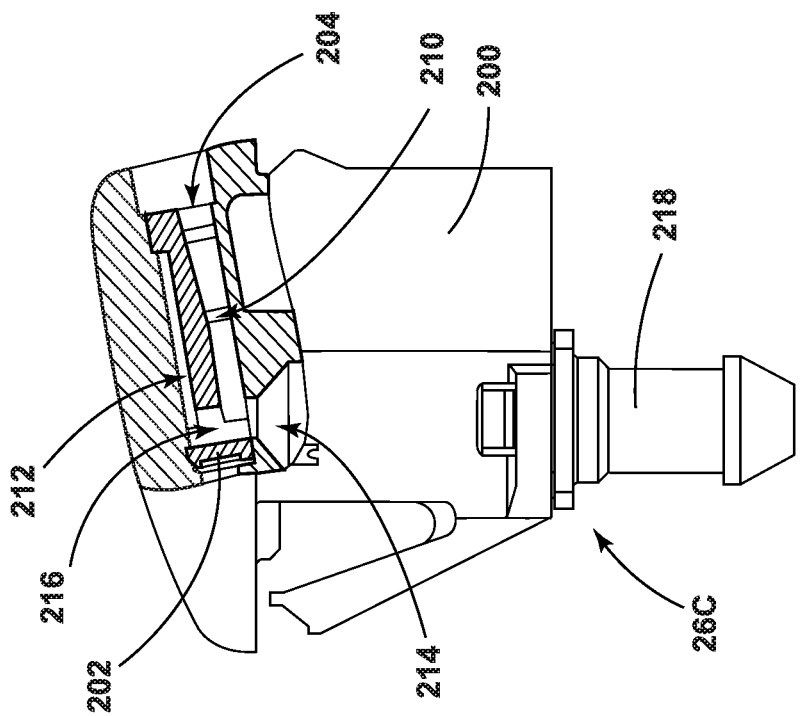
FIG. 16 is a partially cut-away side view of the spray nozzle from FIG. 15.
Figure 15:
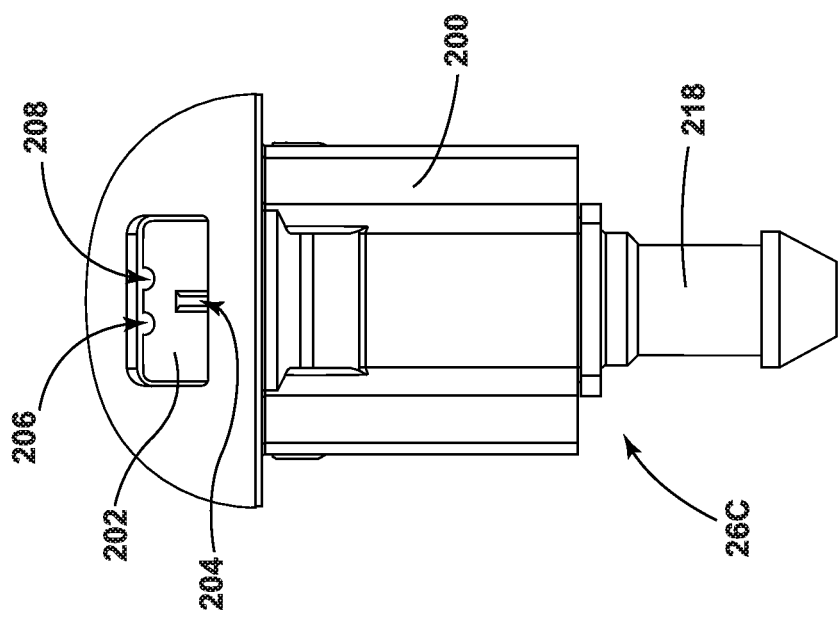
FIG. 15 is a front view of a combination spray nozzle according to yet another embodiment.
Figures 17, 18:
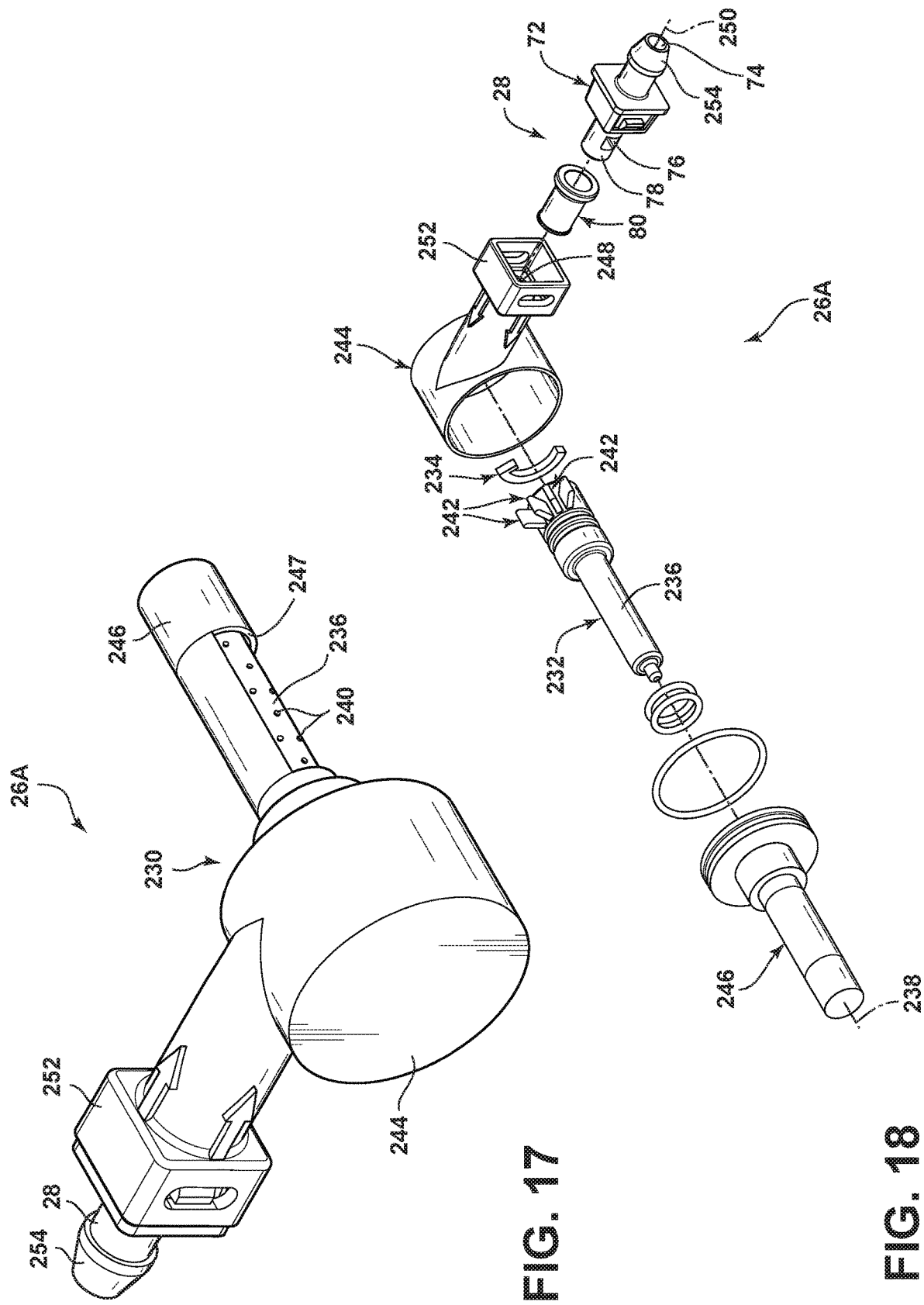
FIG. 17 is a perspective view of an articulating spray nozzle according to still another embodiment.
FIG. 18 is an exploded view of the articulating spray nozzle of FIG. 17.

Referring to FIGS. 15-16, a spray nozzle 26C with a combination fan spray pattern according to one embodiment is shown. One configuration for the combination spray nozzle 26C is described in U.S. Pat. No. 8,061,630, issued Nov. 22, 2011, the complete disclosure of which is incorporated herein by reference. The combination spray nozzle may also take on forms different from what is disclosed in the aforementioned reference.

The spray nozzle 26C includes an nozzle body 200 which supports a spray-building element, such as a chip 202 inserted into the nozzle body 200, with the chip 202 defining multiple outlets, including a narrow, rectangular fan jet exit opening 204, a first point jet exit opening 206, and a second point jet exit opening 208, which are arranged symmetrically on each side of the fan jet exit opening 204.

The chip 202 has a fan jet producing section 210 for producing an oscillating, large-area fan jet that issues from the fan jet exit opening 204 and a point jet producing section 212 for producing point jets located in the wetting area of the fan jet and which issue from the first and second point jet exit openings 206, 208.

A delivery channel 214 extending through the nozzle body 200, which can be in fluid communication with an outlet of the check valve 28 (FIG. 1), opens into an insert entrance channel 216 configured in chip 202. Insert entrance channel 216 is connected to the fan jet producing section 210 and the point jet producing section 212. The nozzle body 200 can have an adapter 218 for effecting connection of the delivery channel 214 to the check valve 28 (FIG. 1). Other structures for establishing a fluid connection to the check valve 28 are possible.

The nozzle body 200 can be adapted for insertion into a nozzle socket or other suitable supporting structure on the combination bracket 30. Other structures for coupling the spray nozzle 26C with the combination bracket 30 are possible, including removable or non-removable mountings, and configurations where a portion of the spray nozzle 26C is integrally formed with the combination bracket 30.

Referring to FIGS. 17-19B, an articulating spray nozzle 26A with a dynamic spray pattern according to one embodiment is shown. One configuration for the articulating spray nozzle 26A is described in U.S. patent application Ser. No. 16/731,266, filed Dec. 31, 2019, the complete disclosure of which is incorporated herein by reference. The articulating spray nozzle may also take on forms different from what is disclosed in the aforementioned reference.

The articulating spray nozzle 26A can generally comprise three primary components: a housing 230, a nozzle core 232 rotatably coupled to the housing 230, and means 234 for rotationally biasing the nozzle core 232 to a home position within the housing 230, which components are adapted to be operatively connected together, optionally in a releasable manner.

The housing 230 can be adapted for insertion into a nozzle socket or other suitable supporting structure on the combination bracket 30. Other structures for coupling the spray nozzle 26A with the combination bracket 30 are possible, including removable or non-removable mountings, and configurations where a portion of the spray nozzle 26A is integrally formed with the combination bracket 30.

The nozzle core 232 is rotatably coupled to the housing 230, configured to receive fluid from the reservoir 14 (FIG. 1), and adapted to channel and expel a jet of the fluid away from the nozzle assembly and onto sensor 12 (FIG. 1). The nozzle core 232 includes a sprayer shaft 236 that extends along a central axis 238 and defines an internal duct adapted for axial flow of fluid therethrough.

The sprayer shaft 236 comprises at least one outlet 240 that is disposed along the length of the sprayer shaft 236.

The outlet 240 is generally peripherally located on the sprayer shaft 236, such that when the sprayer shaft 236 is tubular and cylindrical, the outlet 240 may be referred to as a radial outlet 240. It is to be appreciated that the sprayer shaft 236 may comprise any number of outlets 240 (e.g. 2 or more), which may be independently sized and located about periphery of the sprayer shaft 236.

The nozzle core 232 includes one or more vanes 242 extending outwardly from one end of the sprayer shaft 236. The vanes 242 are adapted to receive fluid to rotationally bias the nozzle core 232 to an activated position. More specifically, the nozzle core 232 functions similarly to a turbine or other such rotary mechanical device by extracting and converting energy from a fluid flow into work (i.e., rotating the nozzle core 232 to an activated position against the biasing means 234, which is described in further detail below).

The housing 230 is adapted to be rotatably coupled to the nozzle core 232 and enclose at least a portion of the sprayer shaft 236 and the vane(s) 242 thereof. In certain embodiments, the housing 230 comprises a hub 244 configured to be disposed about a portion of the sprayer shaft 236 and the vane(s) 242 and a seat 246 configured to be disposed about another portion of the sprayer shaft 236. The seat 246 can define a window 247 that exposes the outlet(s) 240. In some embodiments, the seat 246 extends axially from the hub 244 (e.g. along axis 238), such that the seat 246 and the nozzle core 232 are disposed in coaxial relation.

The housing 230 comprises an inlet 248 adapted for directing fluid into the hub 244. In certain embodiments, the check valve 28 can be disposed fluidly upstream of the inlet 248. The check valve 28 is configured for unidirectional flow into the housing 230, i.e., preventing backflow from the hub 244 and/or sprayer shaft 236 out the inlet 248. In the present embodiment, the check valve 28 comprises the sleeve-configuration described for the first embodiment. The check valve 28 can define a central axis 250 that is orthogonal to the central axis 238 of the sprayer shaft 236 of the nozzle core 232. Other orientations of the check valve 28 relative to the sprayer shaft 236 are possible.

The housing 230 can comprise a valve housing 252 of the check valve 28. In certain embodiments, the valve body 72 of the check valve 28 comprises an adapter configured to be disposed adjacent the housing 252, e.g. to provide a connection/attachment point 254 for an external component (e.g. conduit 24 of FIG. 1). Other structures for establishing a fluid connection to the check valve 28 and reservoir 14 are possible.

The nozzle 26A can comprise biasing means 234 for rotationally biasing the nozzle core 232 to a home position within the housing 230. The biasing means 234 is not particularly limited, and may comprise, or be, any means for rotationally biasing the nozzle core 232 toward the home position. Examples of suitable biasing means include springs (e.g. coil springs, torsion springs, compression springs, clock springs, leaf springs, etc.), levers, resiliently flexible/deformable materials, etc.

The articulating spray nozzle 26A is adapted to direct a stream of fluid, via the outlet(s) 240, into contact with sensor 12 (FIG. 1). As fluid is initially passed into the hub 244 via the inlet 248, such fluid is ultimately expelled from the nozzle core 232 while the nozzle core 232 is initially in the home position (e.g. as illustrated in FIG. 19A). Such fluid passage ultimately works against the vane(s) 242 to rotate the nozzle core 232 from the home position and toward the activated position, changing the orientation of the outlet(s) 240 with respect to the housing 230 (e.g. the window 247 of the seat 246) and thus the direction of fluid expulsion from the outlet(s) 240, until the nozzle core 232 is rotated into the activated positon (e.g. as illustrated in FIG. 19B). This rotation movement of the nozzle core 232, and the corresponding arc of the outlet(s) 240, provides a stream of fluid onto multiple points of impact on the sensor 12, including an initial point 256 corresponding to the home position and a final point 258 corresponding to the activated position, as well as various points along a path therebetween (not shown).

Figure 20:
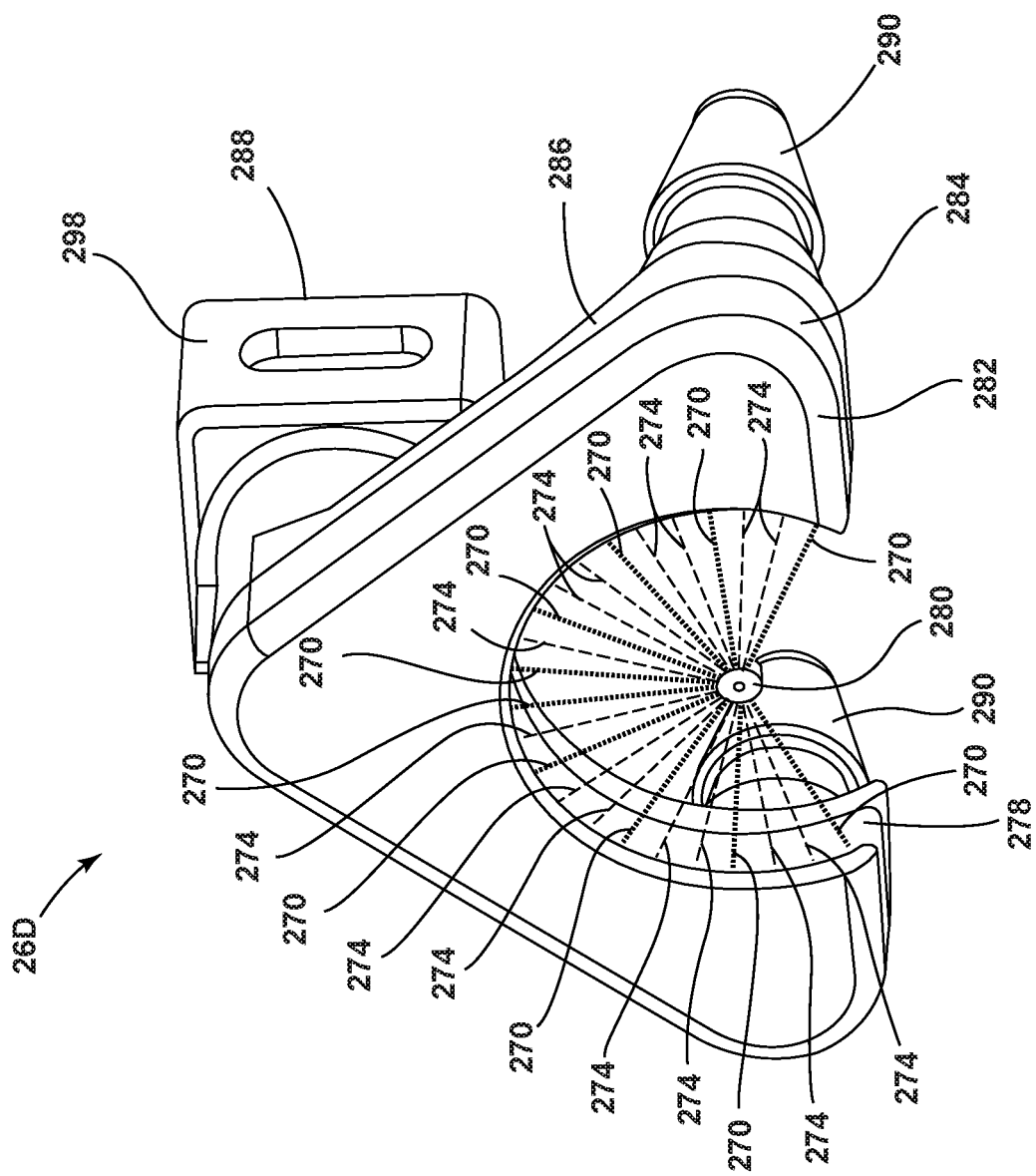
FIG. 20 is a perspective view of a dual media spray nozzle according to a further embodiment.
Figure 21:
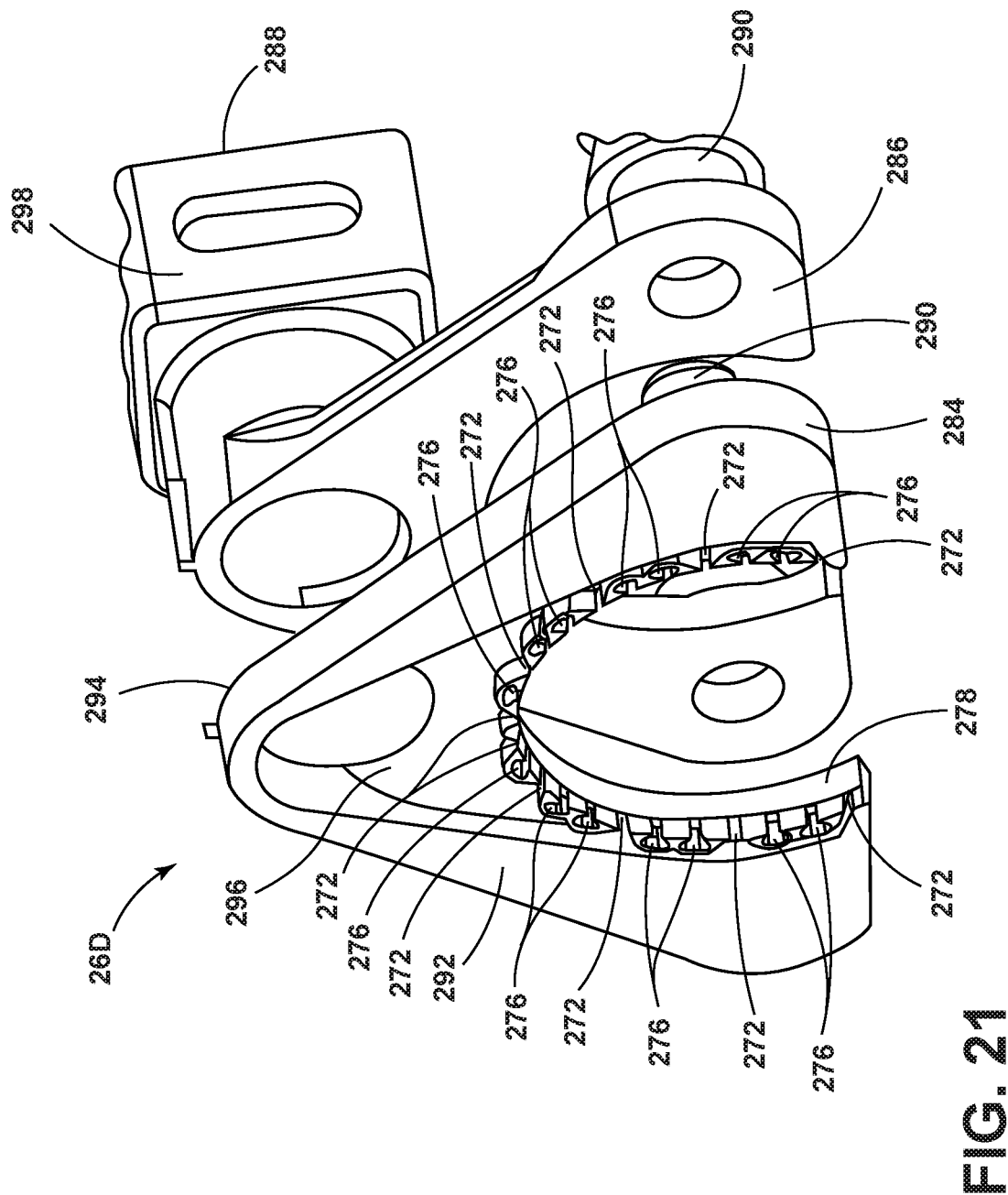
FIG. 21 is an exploded view of the dual media spray nozzle of FIG. 20, with a cover removed for clarity, and a spray element in spaced apart relation to a media inlet body.
Figure 22:
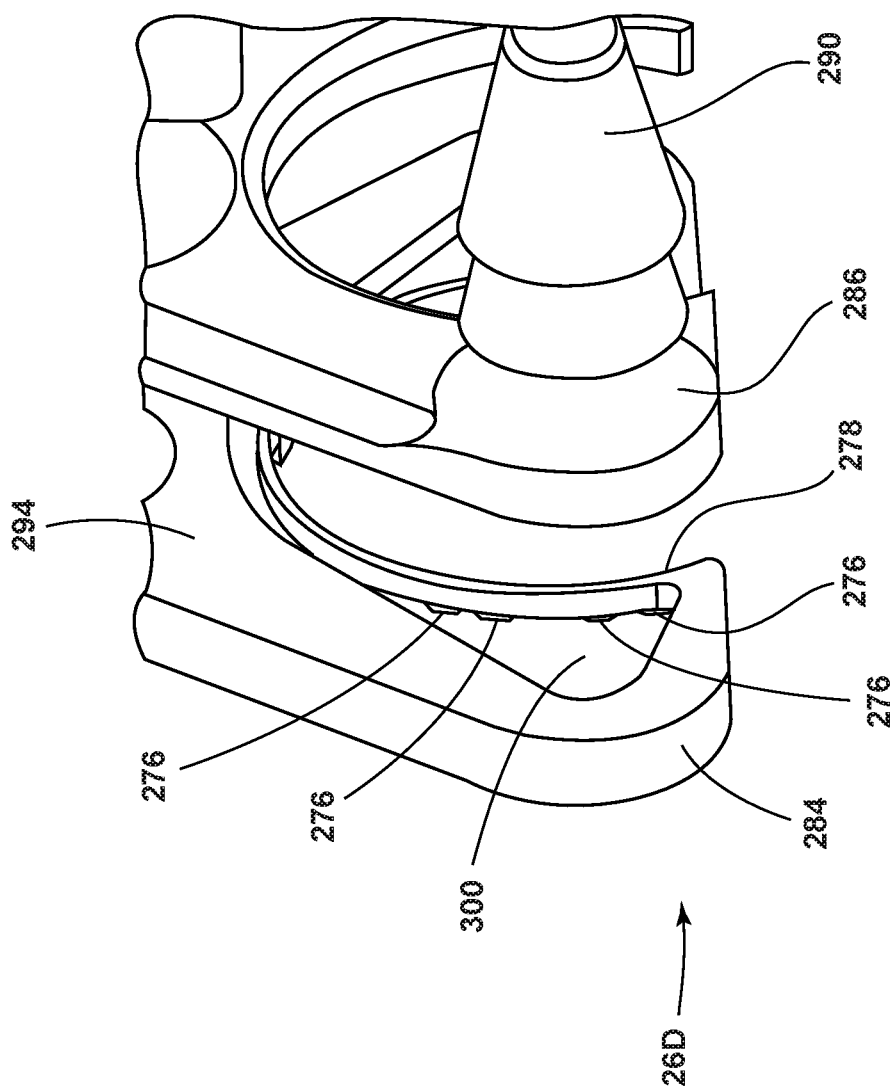
FIG. 22 is a partial perspective view of the other side of the spray element of FIG. 21, with the spray element shown in spaced apart relation to a media inlet body.

Referring to FIGS. 20-22, a dual media spray nozzle 26D according to one embodiment is shown. One configuration for the dual media spray nozzle 26D is described in U.S. Patent Application Publication No. 2020/0061643, published Feb. 27, 2020, the complete disclosure of which is incorporated herein by reference. The dual media spray nozzle may also take on forms different from what is disclosed in the aforementioned reference.

The dual media spray nozzle 26D emits multiple fluid media, including at least a first media 270, such as a cleaning fluid supplied from the reservoir 14 (FIG. 1), emitted from a first array of outlets 272 and a second media 274, such as air, emitted from a second array of outlets 276. The different media 270, 274 may be applied simultaneously or alternatingly. For example, if one media is fluid and the other is air, the fluid media is sprayed first followed by air to dry the target area. An alternative pattern is possible, such as having the air media first loosen the dirt on the article, followed by the fluid, followed thereafter by another spray of air.

As illustrated, the first and second array of outlets 272, 276 can be coplanar. In addition, the outlets 272, 276 may be non-planar depending on the thickness of one or more of the components of the dual media spray nozzle 26D.

The outlets 272, 276 are generally in a curved, semi-annular opening of a sprayer 278. The curved sprayer 278 may be of a variety of shapes, such as a semi-annular ring as illustrated. Other shapes of the sprayer 278 are possible, including, without limitation, square or rectangular. The shape of the sprayer 278 is determined by the shape of the sensor to be cleaned.

The sprayer 278 can be adapted for insertion into a nozzle socket or other suitable supporting structure on the combination bracket 30. Other structures for coupling the spray nozzle 26D with the combination bracket 30 are possible, including removable or non-removable mountings, and configurations where a portion of the spray nozzle 26D is integrally formed with the combination bracket 30.

The first and second array of outlets 272, 276 can be arranged around a central axis. Only upon exiting the dual media nozzle 26D do the two media 270, 274 actually or potentially comingle at the approximate center illustrated as center point or cleaning target area 280 in FIG. 20. As noted above, the two media 270, 274 may be sprayed simultaneously or alternatingly. The cleaning target area 280 is a target area on the sensor 12 to be cleaned.

The dual media nozzle 26D can include a cover 282, a spray element 284, and a media inlet body 286. The spray element 284 is sandwiched between the cover 282 and the media inlet body 286. Extending from the media inlet body 286 is a first media inlet 288 for receiving the first media 270 from reservoir 14 (FIG. 1) and a pair of second media inlets 290 for receiving the second media 274 from a second media reservoir such as a compressor or air tank (not illustrated).

The spray element 284 includes first and second sides 292, 294, which may be front and back sides. Formed on the first side 292 is a first flow path 296 in communication with the first media inlet 288 of the inlet body 286. The first media path 296 is associated with the first array of outlets 272.

The cover 282 can provide a tight seal over the spray element 284 and assures that the first media 270 flowing through the first flow path 296 can only exit the first array of outlets 272. An appropriate gasket material or attachment process (not shown) may be provided between the cover 282 and the spray element 284. Similarly, an appropriate gasket material or attachment process (not shown) may be provided between the spray element 284 and the media inlet body 286.

In certain embodiments, the check valve 28 (FIG. 1) can be disposed fluidly upstream of the first media inlet 288. The media inlet body 286 can comprise a valve housing 298 of the check valve 28, which can comprises the sleeve-configuration described for the first embodiment). Other structures for establishing a fluid connection to the check valve 28 are possible.

According to this arrangement, the first media 270 flows from the reservoir 14 (FIG. 1), through the check valve 28, into the first media inlet 288, through the first flow path 296, and out of the first array of outlets 272. The flow pattern created by the first media 270 exiting the first array of outlets 272 is illustrated in FIG. 20 in which the first media 270 is shown being emitted from the first array of outlets 272 toward the cleaning target area 280. Other flow patterns are possible.

Formed on the second side 294 is a second flow path 300 in fluid communication with the second media inlet 290 of the inlet body 286. The second flow path 300 is associated with the second array of outlets 276. The second array of outlets 276 is open to the second flow path 300. According to this arrangement, the second media 274 flows from the second media reservoir (not shown), into the second media inlets 290, through the second flow path 300, and out of the second array of outlets 276. The flow pattern created by the second media 274 exiting the second array of outlets 276 is illustrated in FIG. 20 in which the second media 274 is shown being emitted from the second array of outlets 276 toward the cleaning target area 280.

Figure 24:
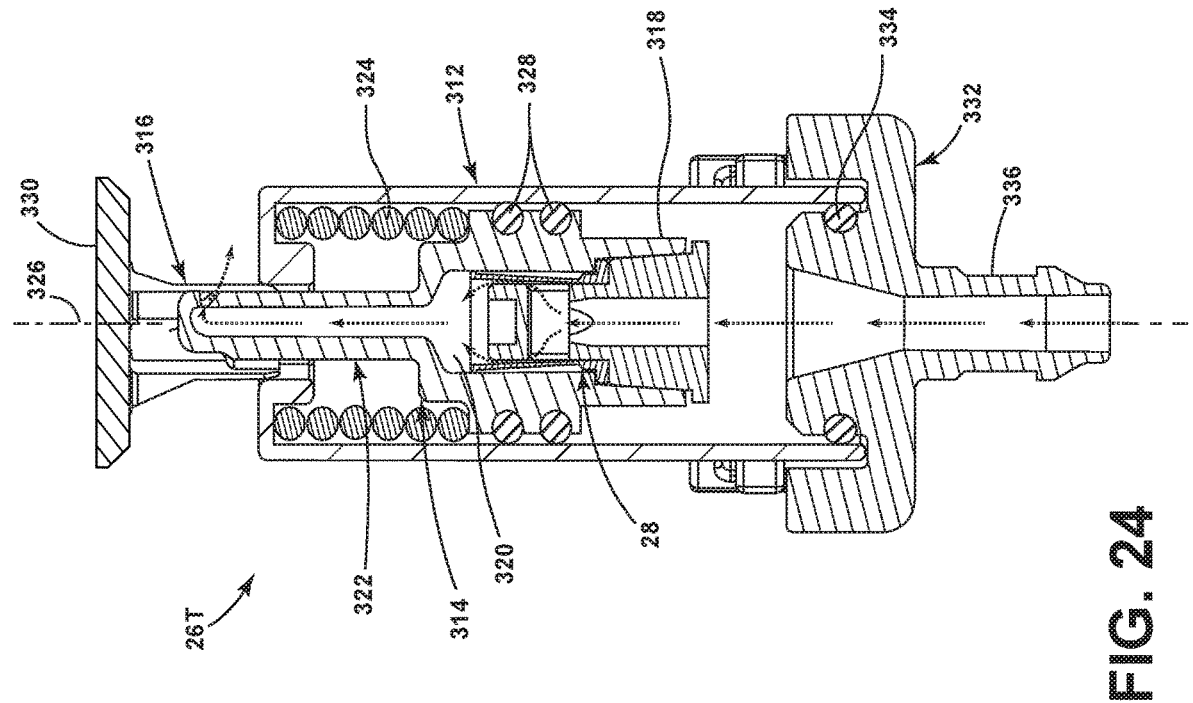
FIG. 24 is a cross-sectional view of the telescoping spray nozzle of FIG. 23, shown in an active state.
Figure 23:
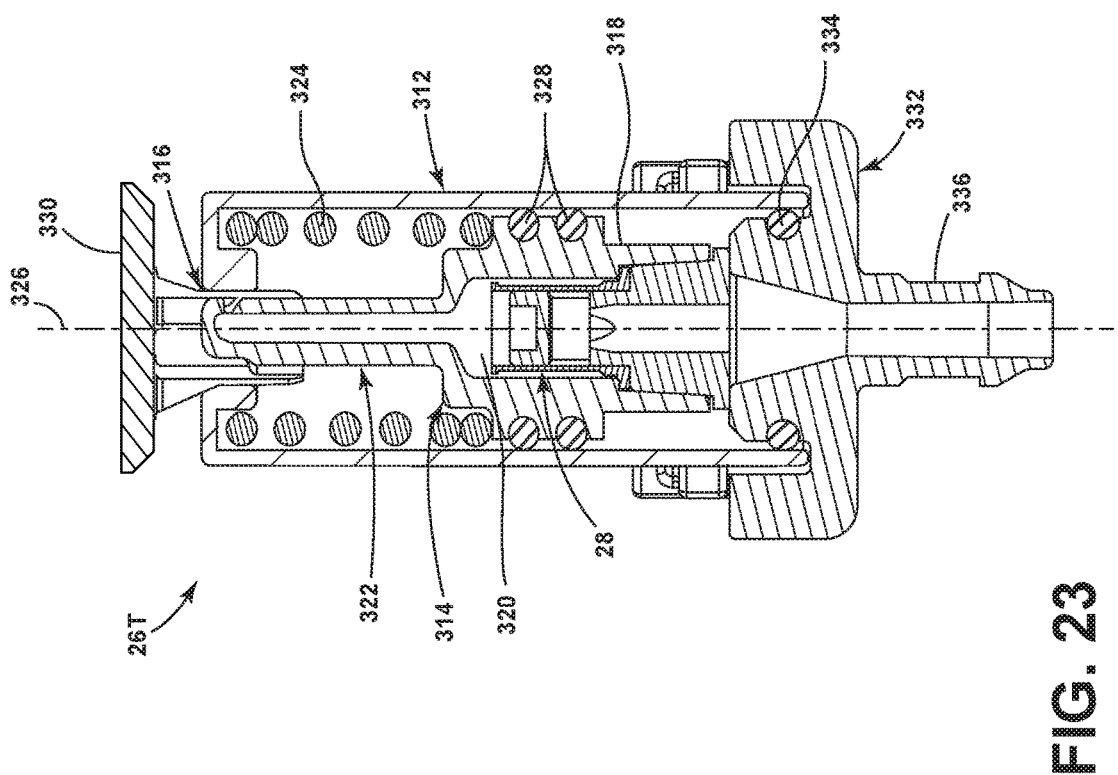
FIG. 23 is a cross-sectional view of a telescoping spray nozzle according to yet a further embodiment, shown in an inactive state.
Figure 25:
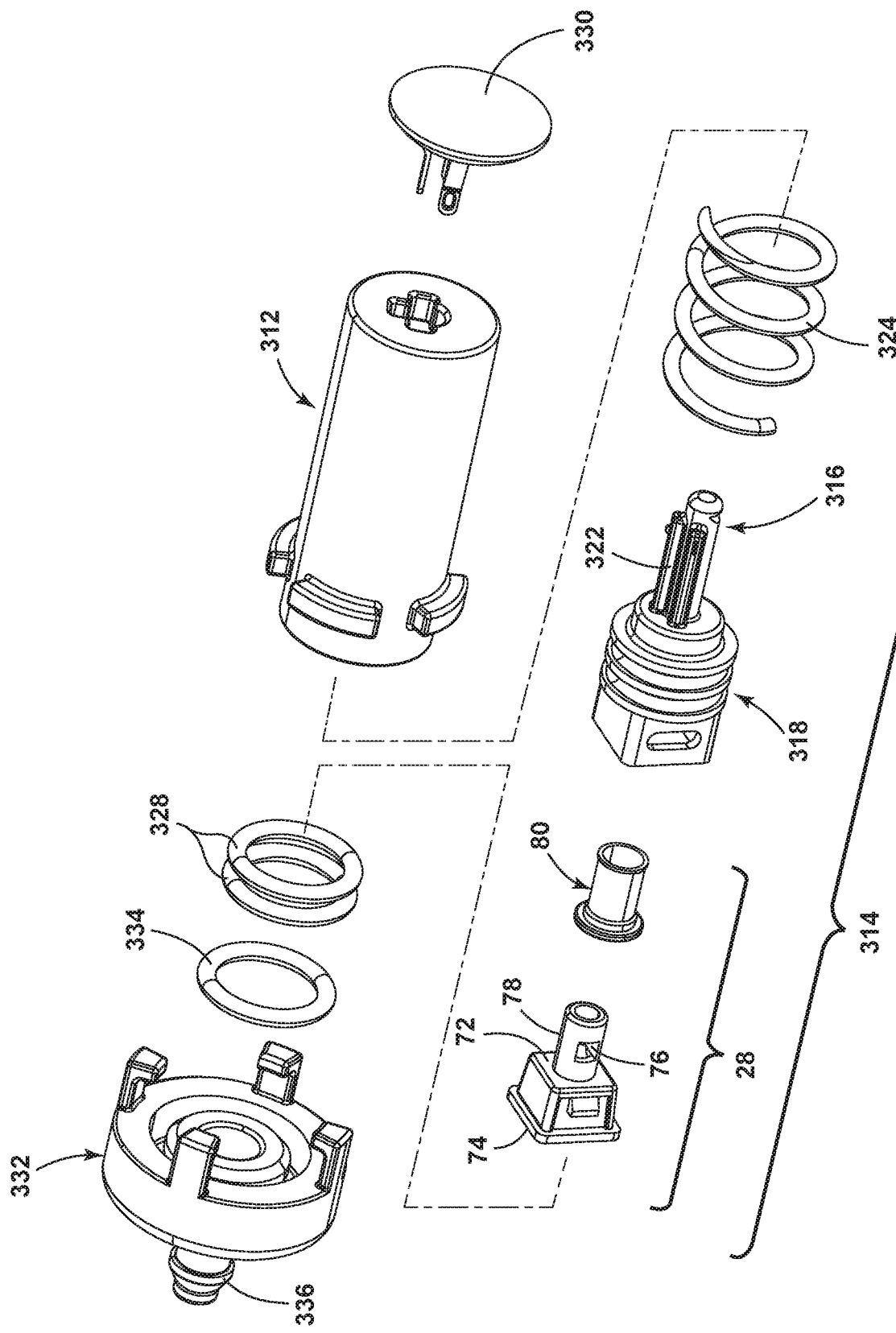
FIG. 25 is an exploded view of the telescoping spray nozzle of FIG. 23.

Referring to FIGS. 23-25, a telescoping spray nozzle 26T for the combination according to one embodiment is shown. One configuration for the telescoping spray nozzle 26T is described in U.S. patent application Ser. No. 16/355,040, filed Mar. 15, 2019, the complete disclosure of which is incorporated herein by reference. The telescoping spray nozzle may also take on forms different from what is disclosed in the aforementioned reference.

The telescoping spray nozzle 26T includes a housing 312, a piston 314 arranged within the housing 312, at least one cleaning fluid outlet 316, and also incorporates the check valve 28, which can comprise the sleeve-configuration described for the first embodiment. The piston 314 is extendable, and can move from an inactive position to active position at a predetermined extension pressure. The cleaning fluid outlet 316 and check valve 28 can be carried by, coupled with, or otherwise moveable with the piston 314. In moving to the active position, the cleaning fluid outlet 316 telescopes relative to the housing 312 to an extended position, an example of which is shown in FIG. 24, and once the cleaning fluid outlet 316 has extended, the check valve 28 opens. In the active position, the telescoping spray nozzle 26T sprays cleaning fluid to clean the sensor 12 (FIG. 1).

The spray nozzle 26T can be adapted for insertion into a nozzle socket or other suitable supporting structure on the combination bracket 30. Other structures for coupling the spray nozzle 26T with the combination bracket 30 are possible, including removable or non-removable mountings, and configurations where a portion of the spray nozzle 26T is integrally formed with the combination bracket 30. Regardless of the specific coupling configuration for the spray nozzle 26T on the bracket 30, the spray nozzle 26T is coupled so that the cleaning fluid outlet 316 can telescope relative to the housing 312, i.e. so that the telescoping movement is not obstructed by the bracket 30.

The piston 314 is configured for linear reciprocal movement along the device axis 326, and includes a piston body 318 defining a hollow interior 320, a cleaning supply tube 322 coupled with the piston body 318, and the at least one cleaning fluid outlet 316. The piston 314 can be hydraulically actuated by the way of the pressure of the cleaning fluid supplied to the spray nozzle 26T, which overcomes the pressure of a return spring 324 acting on the piston 314 and extends the cleaning fluid outlet 316 to the active position once the fluid pressure exceeds the predetermined extension pressure. An appropriate gasket material 328 or attachment process may be provided between the piston 314 and the housing 312.

The check valve 28 can be coupled with the piston body 318 for movement therewith. In at least the inactive position, the check valve 28 is closed and the at least one orifice 76 is sealed by the sleeve 80. When the check valve 28 is open, the at least one orifice 76 can be in fluid communication with the supply tube 322, directly or via the hollow interior 320 of the piston body 318. FIG. 24 shows the sleeve 80 in its expanded state, i.e. with the telescoping spray nozzle 26T in the active position.

The at least one cleaning fluid outlet 316 can be configured to direct a spray of cleaning fluid generally radially with respect to the longitudinal device axis 326. Alternatively, the at least one cleaning fluid outlet 316 can be configured to direct a spray of cleaning fluid generally axially along the device axis 326, generally tangentially relative to the device axis 326, at an angle between the radial, axial, and/or tangential directions, or in multiple directions relative to the device axis 326.

The at least one cleaning fluid outlet 316 can be configured to produce various spray patterns, i.e. a static fan spray, a static jet spray, etc. As shown herein, the cleaning fluid outlet 316 can be molded or otherwise formed in the supply tube 322 for a static fan spray. Alternatively, a spray-building element such as a chip or eyeball can be provided at the cleaning fluid outlet 316 for achieving other spray patterns, such as a jet spray, an oscillating fan spray or a combination jet and fan spray. Alternatively, instead of producing a spray of cleaning fluid, the at least one cleaning out 316 can dispense a stream of cleaning fluid, or otherwise disburse cleaning fluid toward the vehicle surface to be cleaned.

As disclosed above, the piston 314 is moveable between an inactive position, an example of which is shown in FIG. 23, in which the supply tube 322 is retracted at least partially into the housing 312, and an active position, an example of which is shown in FIG. 24, in which the supply tube 322 is extended at least partially out of the housing 312. In the active position, the at least one cleaning fluid outlet 316 can face the sensor 12 (FIG. 1) to be cleaned. Optionally, the supply tube 322 can retract fully, or substantially fully, into the housing 312 in the inactive position.

In some embodiments, a cover 330 can be coupled with or otherwise provided on the end of the supply tube 322. The cover 330 can comprise a trim component of a vehicle and can include a Class A surface, i.e. a visible exterior surface of the vehicle. By virtue of its provision on the supply tube 322, the cover 330 moves with the extendable piston 314 between the inactive and active positions.

An end cap 332 can optionally close the housing 312. An appropriate gasket material 334 or attachment process may be provided between the end cap 332 and the housing 312. The end cap 332 can include an inlet port 336 connectable to a fluid source, i.e. to the reservoir 14 via conduit 24 (FIG. 1). Other structures for establishing a fluid connection to the reservoir 14 are possible.

Many of the embodiments of the modular assembly 32 and/or spray nozzle 26 described above include a check valve 28 having a sleeve-configuration. It is understood that the modular assembly 32 according to any embodiment described herein can incorporate other suitable check valves, with the combination bracket 30 being appropriately adapted to retain said check valve, which retaining it directly, or retaining an assembly including an integrated spray nozzle and check valve. Some additional embodiments of check valves for the combination bracket 30 are disclosed in FIGS. 26-31.

Figure 26:
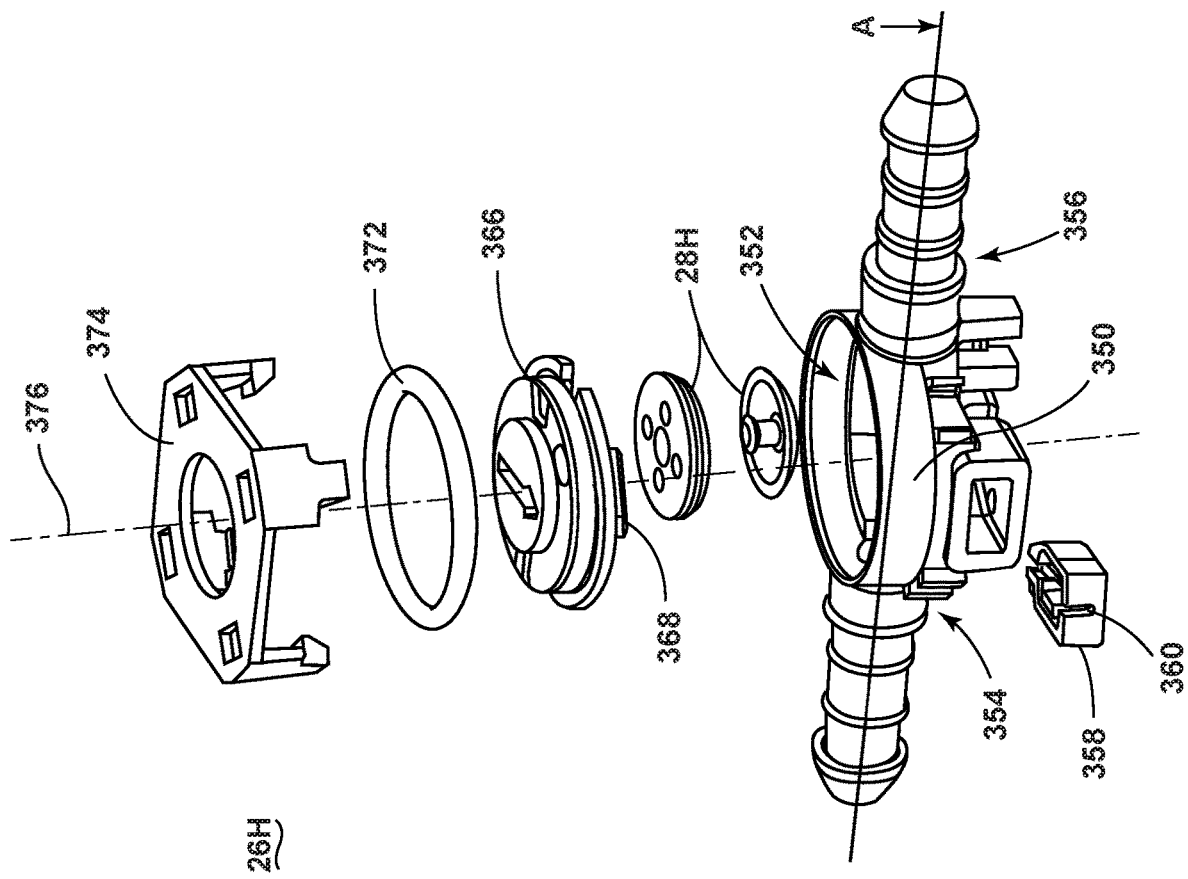
FIG. 26 is an exploded view of a heatable spray nozzle according to still a further embodiment.

Referring to FIGS. 26-28, a heatable nozzle assembly 26H comprising an integrated check valve for the combination bracket according to one embodiment is shown. One configuration for the heatable nozzle assembly 26H is described in International Publication No. WO2019/002185, published Jan. 3, 2019, the complete disclosure of which is incorporated herein by reference. The heatable nozzle assembly may also take on forms different from what is disclosed in the aforementioned reference.

The heatable nozzle assembly 26H includes a nozzle body 350 defining a fluid chamber 352. A first fluid port 354 and a second fluid port 356 are provided at the fluid chamber 352. The first fluid port 354 can be connectable to a fluid source, i.e. to the reservoir 14 via conduit 24 (FIG. 1). Other structures for establishing a fluid connection to the reservoir 14 are possible.

The heatable nozzle assembly 26H can be adapted for insertion into a nozzle socket or other suitable supporting structure on the combination bracket 30. Other structures for coupling the spray nozzle 26H with the combination bracket 30 are possible, including removable or non-removable mountings, and configurations where a portion of the spray nozzle 26H is integrally formed with the combination bracket 30. Regardless of the specific coupling configuration for the spray nozzle 26H on the bracket 30, the spray nozzle 26H is coupled so that fluid within the assembly can be heated by a heating line 364.

A spray-building element, such as a chip 358, can be inserted into the nozzle body 350 and can define an outlet 360 configured to produce a spray pattern, such as a static fan spray, a static jet spray, an oscillating fan spray or a combination jet and fan spray.

The heatable nozzle assembly 26H optionally has a check valve 28H provided in the fluid chamber 352. Alternatively, the check valve 28H can be provided separately from the nozzle 26H.

The check valve 28H can comprise an umbrella check valve designed to open and close at predetermined pressures. In another embodiment, the check valve 28H for the heatable nozzle assembly 26H can comprise the sleeve-configuration as described previously.

The nozzle assembly 26H also includes a heating line 364 running in the area of the check valve 28H and nozzle chip 358 (see FIG. 28). The heating line 364 can pass through the first fluid port 354, into the fluid chamber 352, and out through the second fluid port 356.

The nozzle assembly 26H can include a rotary disk 366 having at least one deflector 368, 370 for the heating line 364. In this embodiment, the at least one deflector 368, 370 is embodied as a projection. Other configurations for the deflector are possible. Also in this embodiment, two deflectors 368, 370 are shown, although other numbers are possible, including having one deflector.

In some embodiments, the nozzle assembly 26H has a seal 372 and a fastening element 374. The seal 372 and fastening element 374 are used to arrange the rotary disk 366 rotatably on the fluid chamber 352. However, other suitable ways of attaching the rotary disk 366 to the fluid chamber 352 are possible. The rotary disk 366 can be rotated about an axis 376. The rotary disk 366 may in particular be rotationally symmetrical to axis 376. If, as in the embodiment, a cylindrical fluid chamber 352 is provided, this can also be rotationally symmetrical to axis 376.

FIG. 27 shows a configuration in which the rotary disk 366 is arranged in a first rotary position. In the first rotary position, the deflectors 368, 370 are arranged in such a way that the heating line 364 can run in a straight line through the fluid chamber 352, through each port 354, 356. FIG. 28 shows a configuration is shown in which the rotary disk 366 is rotated to a second rotary position, and the deflectors 368, 370 are in engagement with the heating line 364, with a portion 378 of the heating line 364 displaced by engagement with the deflectors 368, 370. In the second rotary position, through the engagement with the deflectors 368, 370, the heating line 364 runs in the area of the check valve 28H and chip 358. As a result, the heat input can be directed in the area of the check valve 28H and chip 358.

Figure 30:
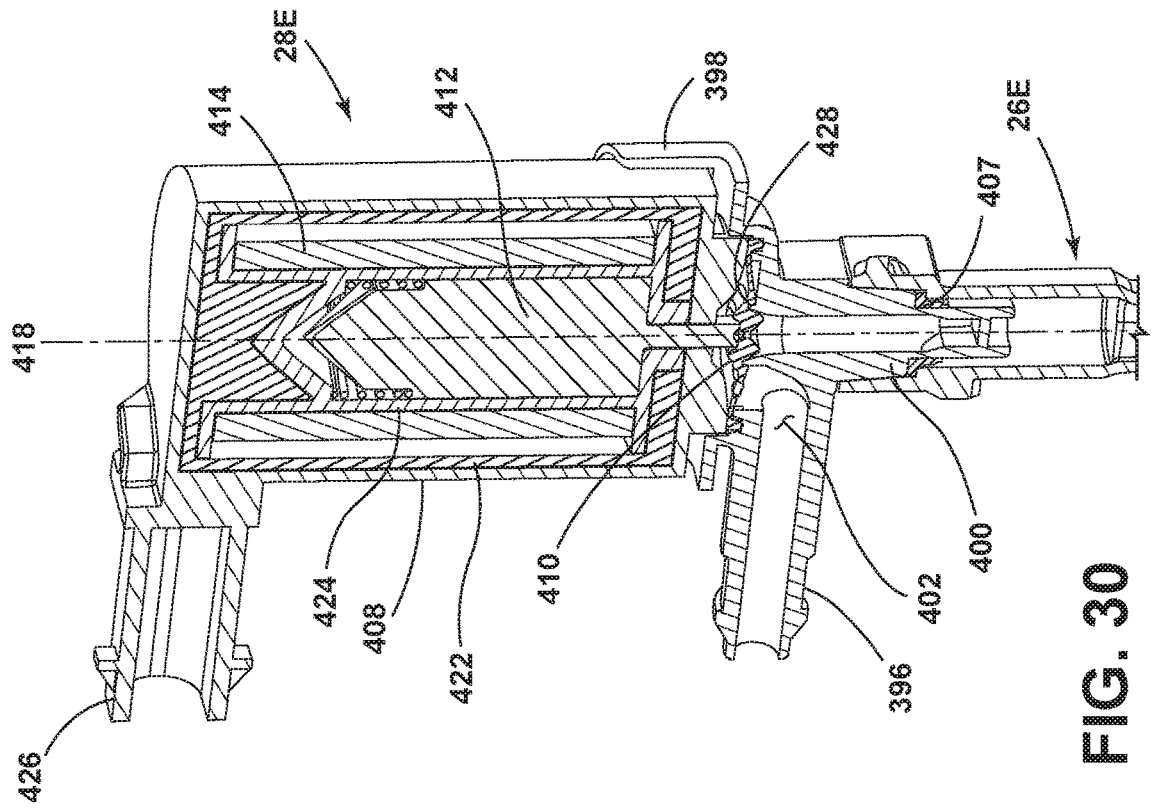
FIG. 30 is an enlarged cross-sectional view of a portion of the assembly taken along line 30-30 in FIG. 29.
Figure 29:
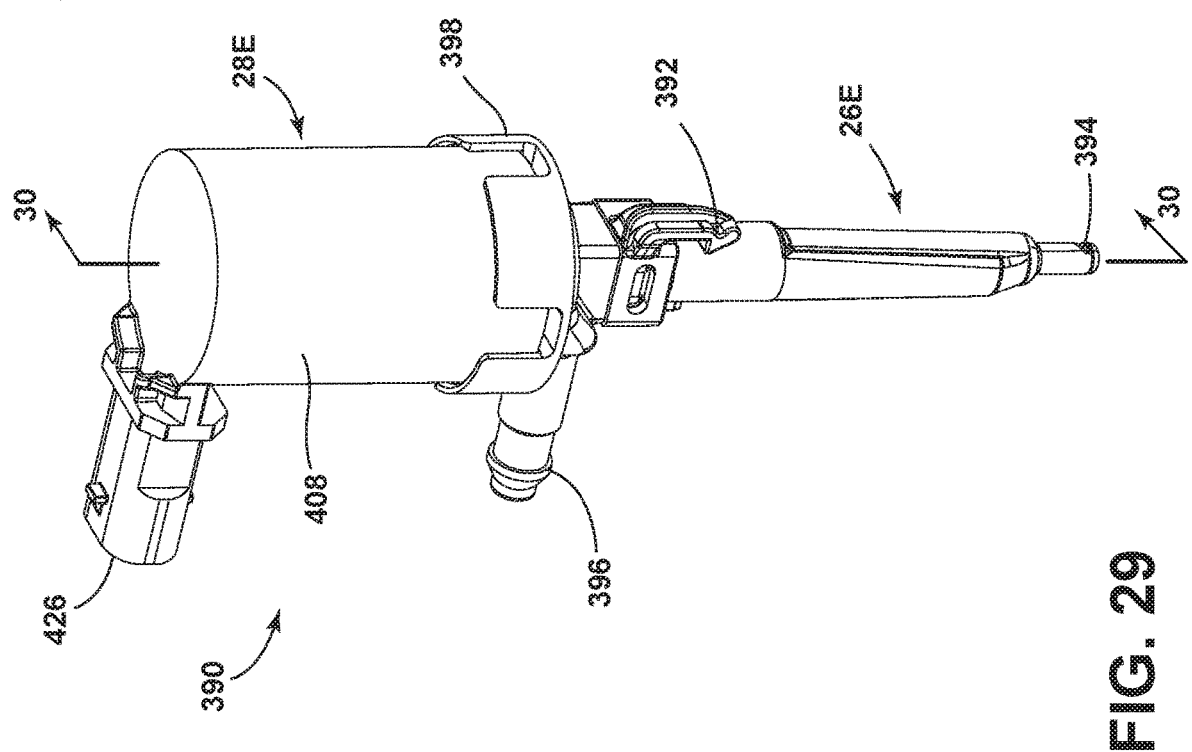
FIG. 29 is a perspective view of an assembly including a spray nozzle and an electronic check valve according to another further embodiment.
Figure 31:
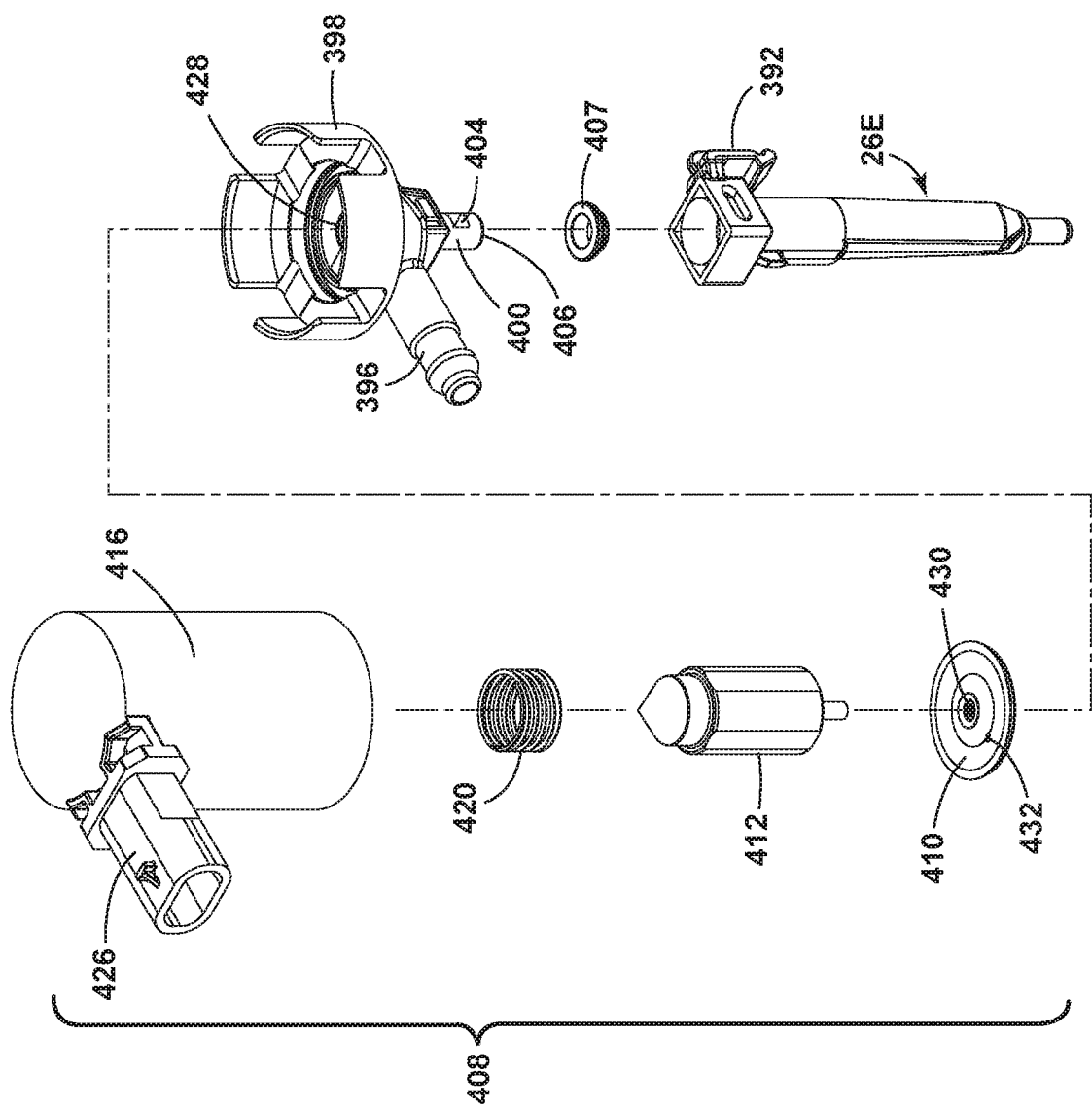
FIG. 31 is an exploded view of the assembly of FIG. 29.
Figure 33:
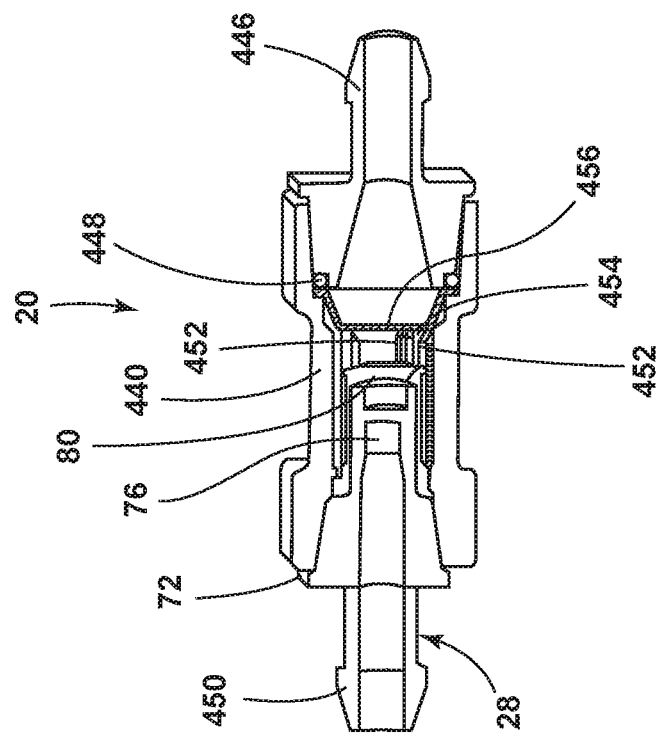
FIG. 33 is a cross-section view of the fluid accessory of FIG. 32.
Figure 32:
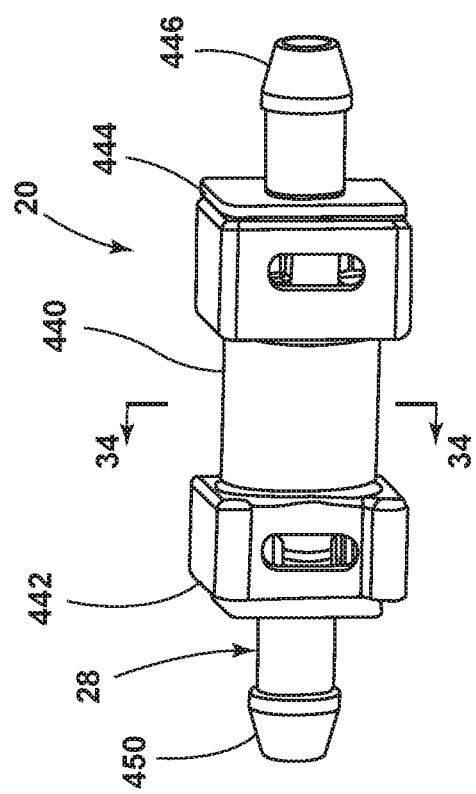
FIG. 32 is a perspective view of a fluid accessory having a filter and incorporating a check valve according to even a further embodiment.
Figure 35:
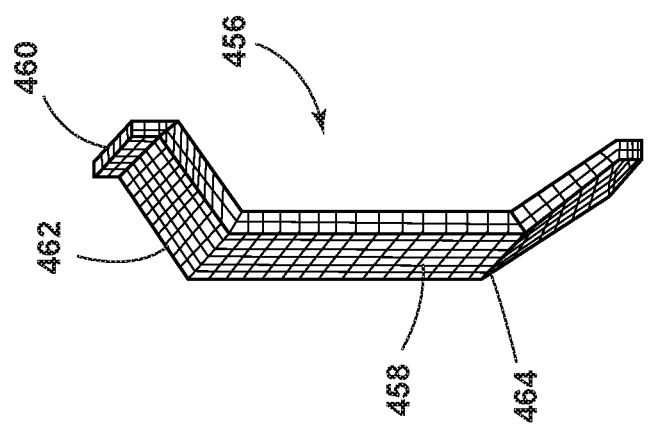
FIG. 35 is a partial perspective view of a filter media of the fluid accessory of FIG. 32.
Figure 34:
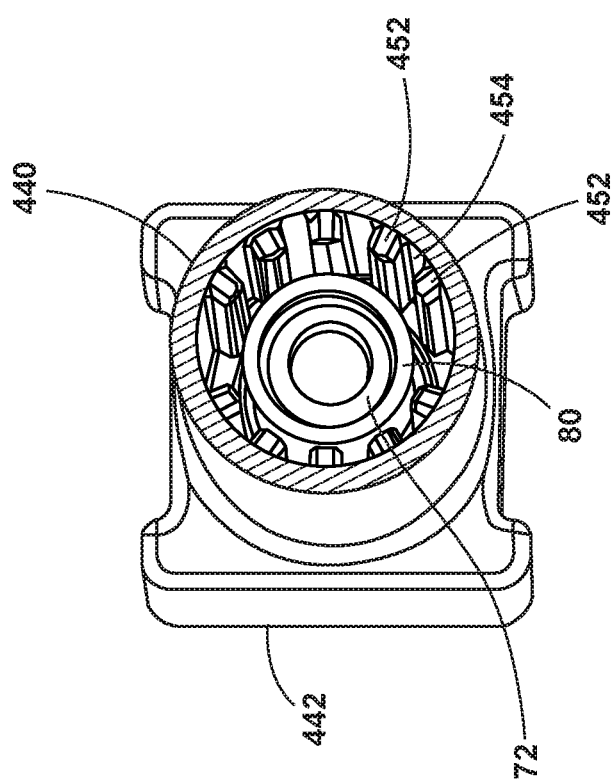
FIG. 34 is a partial cross-section view of the fluid accessory taken along line 34-34 in FIG. 32.

Referring to FIGS. 29-31, an assembly 390 with an integrated spray nozzle 26E and electronic check valve 28E for the combination bracket according to one embodiment is shown. One configuration for the assembly 290, spray nozzle 26E, and electronic check valve 28E is described in European Patent Application No 19315112.3, filed Sep. 12, 2019, the complete disclosure of which is incorporated herein by reference. The assembly 390, spray nozzle 26E, or electronic check valve 28E may also take on forms different from what is disclosed in the aforementioned reference.

While the electronic check valve 28E is shown as being integrated with a spray nozzle 26E, it is understood that in some embodiments of the modular assembly, the electronic check valve 28E can be separate from the spray nozzle 26E, including being separately coupled with the combination bracket 30. It is also understood that the modular assembly 32 according to any embodiment described herein can include an electronic check valve 28E, including but not limited to incorporating the electronic check valve 28E with the spray nozzle 26.

The assembly 390 can be adapted for insertion into a socket or other suitable supporting structure on the combination bracket 30. Other structures for coupling the assembly 390 with the combination bracket 30 are possible, including removable or non-removable mountings, configurations where the spray nozzle 26E and check valve 28 are mounted separately, rather than in an integrated assembly, and configurations where a portion of the spray nozzle 26E or check valve 28E is integrally formed with the combination bracket 30. In one embodiment, the assembly 390 can be provided with a mounting clip 392 or other attachment features for removable installation on the combination bracket 30.

The spray nozzle 26E includes at least one outlet 394, which can define a fluid outlet of the assembly 390. The valve 28E includes at least one inlet 396. A fluid flow pathway extends through the assembly 390, from the inlet 396 to the outlet 394. The valve 28E controls the flow of cleaning fluid through the fluid flow pathway.

The valve 28E can be electronically controlled to selectively allow ingress of cleaning fluid into the spray nozzle 26E. In the embodiment shown herein, the valve 28E is an electronic valve, such as a solenoid valve. In one embodiment, the valve 28E comprises a valve body 398 having the at least one valve inlet 396 and at least one valve outlet 400. A fluid passage 402 formed in the valve body 398 provides a pathway for cleaning fluid from the inlet 396 to the valve outlet 400. The valve outlet 400 can comprise at least one orifice 404 in fluid communication with the spray nozzle 26E. In the embodiment shown herein, the valve outlet 400 can comprise a hollow tip 406 projecting from the valve body 398 through a proximal end of the spray nozzle 26E and into the interior of the spray nozzle 26E, with the at least one orifice 404 provided on the tip 406. A sealing element 407 can be provided at the interface between the nozzle 26E and the valve body 398 to prevent leakage of cleaning fluid at the interface.

The valve 28E includes an actuator 408 and a pilot-operated valve member comprising a flexible diaphragm 410 that operates to open and close the valve 28E as described in further detail below. The actuator 408 of the illustrated embodiment is a solenoid actuator including a plunger 412 and a coil 414 concentrically arranged within an actuator housing 416. The plunger 412 is configured for linear reciprocal movement along an axis 418. A closing spring 420 urges the plunger 412 toward the diaphragm 410, i.e. toward a closed position.

The nozzle 26E can be elongated along the valve axis 418, with fluid flowing through the spray nozzle 26E along the axis 418 to reach the outlet 294. Alternatively, the valve 28E and spray nozzle 26E can be orthogonal to each other, such as with the valve axis 418 being perpendicular to a flow direction of fluid through the spray nozzle 26E before reaching the outlet 394. Other orientation between the valve 28E and spray nozzle 26E are possible.

The outlet 394 of the spray nozzle 26E can be configured to direct a spray of cleaning fluid generally radially with respect to the axis 418. Alternatively, the outlet 394 can be configured to direct a spray of cleaning fluid generally axially along the axis 418, generally tangentially relative to the axis 418, at an angle between the radial, axial, and/or tangential directions, or in multiple directions relative to the device axis 418.

The valve body 398 can be coupled with the actuator housing 416 using any suitable mechanical coupling or forming method. The actuator housing 416 can include an outer housing 422 and an inner housing or core tube 424. The coil 414 can be provided between the outer housing 422 and core tube 424, with the core tube 424 isolating the coil 414 from the cleaning fluid. The plunger 412 is linearly reciprocal within the core tube 424.

A power connector 426 on the actuator housing 416 is connectable to an external current supply to control the solenoid valve actuator 408 by an electrical current that passes through the coil 414. In one embodiment, the valve's power connector 426 can be connectable to the power source 36 of the vehicle 10 (FIG. 1). In another embodiment, mounting of the assembly 390 on the combination bracket 30 couples the valve's power connector 426 with the power connection 34 (FIG. 1) of the combination bracket 30.

The valve body 398 comprises a valve seat 428 surrounding an opening in the fluid passage 402 between the valve inlet 396 and the valve outlet 400. The diaphragm 410 flexes into engagement with the valve seat 428 to close the valve 28E and flexes away from the valve seat 428 to open the valve 28E. The plunger 412 is configured to press the diaphragm 410 against the valve seat 428, and improve sealing in the closed position. Channels (not shown) defined between the plunger 412 and the inner surface of the core tube 424 allow for cleaning fluid to flow to the spring-end of the plunger 412.

The diaphragm includes a drain passage 430 and a pilot or bypass hole 432. The bypass hole 432 is configured to equalize pressure on both sides of the diaphragm 410 when the plunger 412 is in a closed position. The diaphragm 410 is flexible between an open state in which it is spaced from the valve seat 428 and permits cleaning fluid flow from the valve inlet 396 through the valve outlet 400 and a closed state in which the plunger 412 presses the diaphragm 410 against the valve seat 428 and prevents cleaning fluid flow through the valve outlet 400.

Referring to FIGS. 32-35, one embodiment of the fluid accessory 20 for the combination bracket according to one embodiment is shown. One configuration for the fluid accessory 20 is described in U.S. Patent Application Publication No 2020/0009596, published Jan. 9, 2020, the complete disclosure of which is incorporated herein by reference. The fluid accessory may also take on forms different from what is disclosed in the aforementioned reference.

Figure 36:
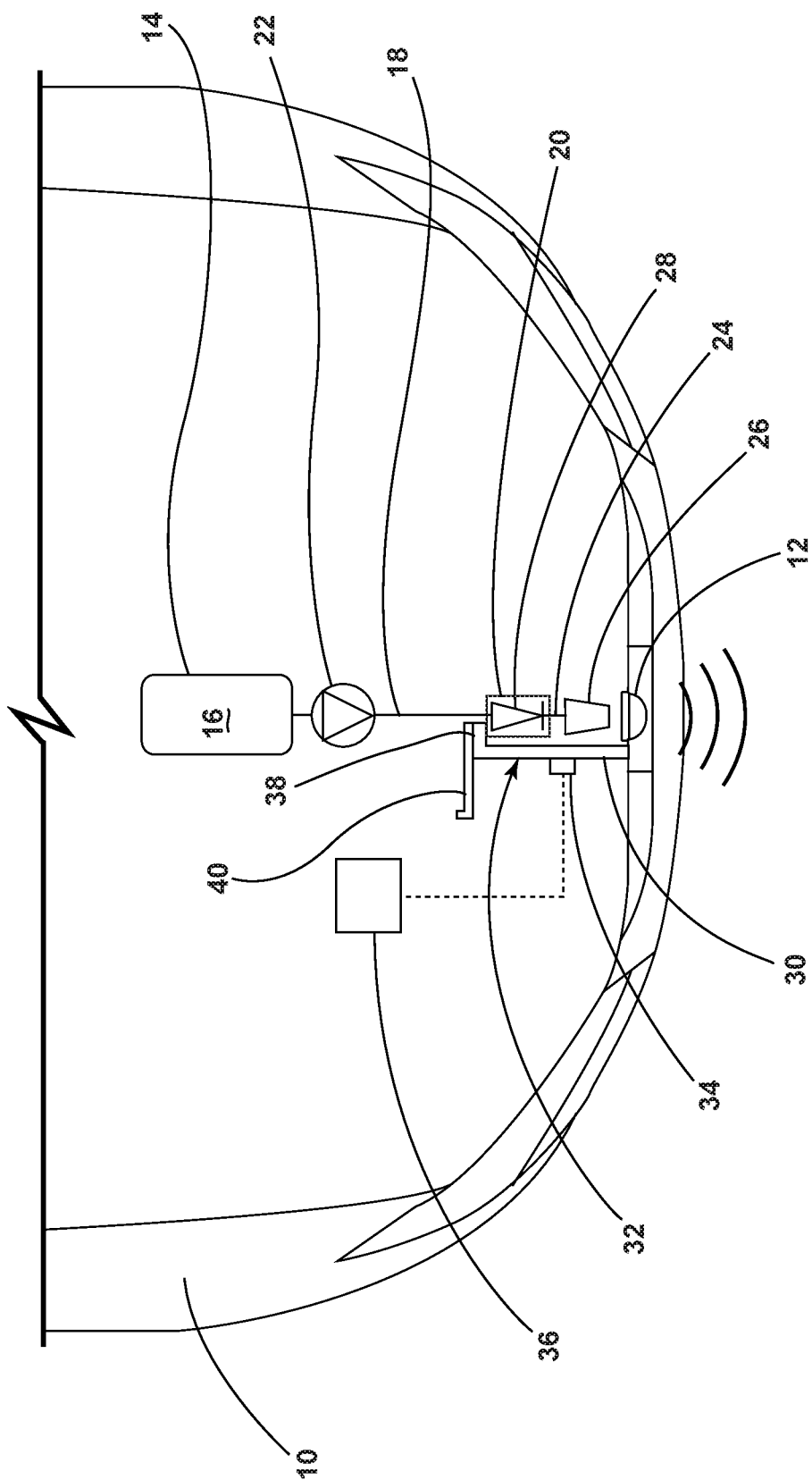
FIG. 36 is an environmental schematic view of a fluid spray system according to another embodiment.

In FIG. 1, the fluid accessory 20 is shown separate from the bracket 30. FIG. 36 shows an environmental schematic view of one embodiment of the fluid spray system incorporating the fluid accessory 20 on the bracket 30. In describing the fluid accessory 20 of FIGS. 32-25, reference will be made to the system of FIG. 36, although it is understood that the disclosed fluid accessory 20 may be similarly utilized in the system of FIG. 1.

The fluid accessory 20 generally comprises a body 440 having an inlet end 442 and an outlet end 444. An outlet adapter 446 is inserted into the outlet end 444 of the body 440. An O-ring 448 creates a fluid tight seal between the outlet adapter 446 and the body 440.

Optionally, check valve 28 may be integrated with the fluid accessory 20, rather than being integrated with the spray nozzle 26 or being separately provided on the combination bracket 30. In the embodiment shown, the check valve 28 is inserted into the inlet end 442 of the body 440. The inlet end 442 of the body 440 can comprise a valve housing of the check valve 28. In certain embodiments, the valve body 72 of the check valve 28 comprises an inlet adapter 450. The first and second conduits 18 and 24 (FIG. 36) are secured to the inlet adapter 450 and the outlet adapter 446, respectively. Thus, fluid able to flow from the reservoir 14 to the spray nozzle 26 through the fluid accessory 20. Other structures for establishing a fluid connection to the check valve 28 and reservoir 14 are possible.

The body 440 includes a plurality of longitudinal protrusions 452 extending radially into the body 440. The longitudinal projections 452 and the sleeve 80 of the check valve 28, which is fitted within the body 440, cooperate to define a plurality of debris collection channels 454 for collecting debris flowing within the fluid and through the fluid accessory 20. This prevents debris from obstructing flow through the remaining components of the fluid accessory 20 and onto the sensor 12.

A filter or filter media 456 is provided within the body 440, between the inlet and outlet of the body 440. In the embodiment shown, the filter media 456, which is positioned between the outlet adapter 446 and the outlet end 444 of the body 440. Preferably, the filter media 456 is a mesh screen formed from any suitable material, such as stainless steel, nylon, polyester, or the like. Regardless of the material chosen, the filter media 456 includes a plurality of filter holes 458 that permit the passage of fluid. The filter holes 458 are large enough to allow fluid to pass through, but prevent the passage of foreign particles or debris. Thus, the size of the filter holes 458 are preferably in the range of about 50 microns to about 500 microns. The size of the filter holes 458 is determined based on the amount, size, and type of debris expected to be found in the fluid. More particularly, the filter media 456 is preferably a domed-member having a flange 460, an arm 462 extending angularly therefrom, and a body 464. The filter media 456 is not limited to the geometry illustrated herein. As such, the filter media 456 may also be a planar member without a domed configuration. Additionally, it is to be understood that the filter media 456 may have any cross-sectional shape, such as circular, in order to conform to the body 440. Still further, it is understood that the fluid accessory comprising the filter media 456 may be provided without an integrated check valve, and that the check valve 28 can instead be integrated with the spray nozzle 26 or provided separately of both the fluid accessory 20 and the spray nozzle 26 in some embodiments of the fluid spray system.

The fluid accessory 20 can be adapted for insertion into a socket or other suitable supporting structure on the combination bracket 30. Other structures for coupling the fluid accessory 20 with the combination bracket 30 are possible, including removable or non-removable mountings, configurations where the fluid accessory 20 and check valve 28 are mounted separately, rather than in an integrated assembly, and configurations where a portion of the fluid accessory 20 or check valve 28 is integrally formed with the combination bracket 30.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The terms "coupled," "couple," and variable thereof are used herein in their broadest sense to mean and encompass the notions of being formed or integrated with, connected, mounted, attached, or otherwise joined.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology that has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A modular assembly for a fluid spray system of a vehicle, comprising:
   a combination bracket comprising a sensor socket adapted to retainably receive a sensor to mount the sensor thereto, a nozzle socket adjacent to the sensor socket, and a retention point connectable to a support member of a vehicle;
   a spray nozzle removably coupled with the combination bracket and retained within the nozzle socket, the spray nozzle comprising a spray tube, a nozzle inlet at a first end of the spray tube, and a nozzle outlet at an opposite second end of the spray tube, wherein the spray nozzle is adapted to produce a spray of fluid that issues from the nozzle outlet onto the sensor mounted in the sensor socket; and
   a check valve integrated with the spray nozzle and connectable to a fluid conduit and adapted to deliver fluid from the fluid conduit to the nozzle inlet of the spray nozzle, the check valve comprising:
     a valve housing formed by a portion of the spray tube comprising the nozzle inlet; and
     a single-piece valve body having a first end comprising a valve inlet and a second end comprising a valve outlet;
   wherein the single-piece valve body is mounted to the valve housing and the second end of the valve body comprising the valve outlet projects into the portion of the spray tube comprising the nozzle inlet; and
   wherein the nozzle socket comprises a through hole for insertion of the spray tube therein and the single-piece valve body engages the nozzle socket to retain the spray nozzle and the check valve in a mounted position on the combination bracket, wherein in the mounted position the nozzle outlet is distal of the through hole and exposed outside the combination bracket and the valve inlet is proximal of the through hole and exposed outside the combination bracket.

2. The modular assembly of claim 1, wherein the spray nozzle is adapted to produce a spray of cleaning fluid that issues from the nozzle outlet along a spray direction, and wherein the sensor socket is spaced from the nozzle socket along the spray direction.

3. The modular assembly of claim 1, comprising:
   a snap-lock receiver provided on one of the nozzle socket and the single-piece valve body; and
   a snap-lock element provided on the other one of the nozzle socket and the single-piece valve body, the snap-lock element engageable with the snap-lock receiver to retain the spray nozzle and the check valve in the mounted position on the combination bracket.

4. The modular assembly from claim 1, wherein the spray nozzle is adapted to spray fluid in a spray pattern comprising at least one of:
   a static fan spray;
   a static jet spray;

an oscillating fan spray; and
a combination jet and fan spray.

5. The modular assembly from claim 1, comprising at least one other spray nozzle coupled with the combination bracket and adapted to spray fluid onto the sensor mounted in the sensor socket.

6. The modular assembly from claim 5, wherein the spray nozzle is adapted to spray fluid in a first spray pattern and the at least one other spray nozzle is adapted to spray fluid in a second spray pattern that is different than the first spray pattern.

7. The modular assembly from claim 1, wherein the check valve comprises a solenoid actuator, a valve seat, and a flexible pilot-operated diaphragm moveable into and out of engagement with the valve seat.

8. The modular assembly of claim 1, wherein the sensor socket comprises a receiving element, and the sensor is mountable to the receiving element via a snap-fit engagement.

9. The modular assembly of claim 8, wherein the receiving element comprises a plurality of snap-lock webs configured to removably lock the sensor in the sensor socket.

10. The modular assembly from claim 1, wherein the combination bracket comprises a one-piece body made of a plastic material, and the nozzle socket is integrally formed with the sensor socket.

11. The modular assembly from claim 1, wherein the combination bracket comprises an electric heating means which is provided for heating fluid sprayed onto the sensor mounted in the sensor socket.

12. The modular assembly from claim 1, wherein the combination bracket comprises at least one power connection, the power connection being connectable to a power source, at least one of the sensor and the check valve being electrically connectable with the power connection to be supplied with power from the power source.

13. The modular assembly from claim 1, comprising a fluid accessory coupleable with the combination bracket, the fluid accessory comprising a filter media adapted to filter the fluid.

14. The modular assembly from claim 13, wherein the check valve is integrated with the fluid accessory.

15. The modular assembly from claim 1, wherein the single-piece valve body comprises a valve stem having the valve outlet, wherein the valve stem projects into the portion of the spray tube comprising the nozzle inlet.

16. The modular assembly from claim 15, wherein an elastically deformable sleeve is disposed about the valve stem to selectively seal the valve outlet.

17. The modular assembly from claim 1, comprising:
a snap-lock receiver on the nozzle socket; and
a snap-lock element on the single-piece valve body, the snap-lock element engageable with the snap-lock receiver to retain the spray nozzle and the check valve in the mounted position on the combination bracket.

18. The modular assembly from claim 1, wherein the valve inlet and the nozzle outlet are disposed outward of the sensor socket.

19. The modular assembly from claim 1 wherein the sensor socket comprises a base wall and a plurality of side walls extending from the base wall to define an opening into which the sensor is insertable, and wherein a portion of the single-piece valve body comprising the valve inlet projects beyond the base wall to position the valve inlet proximally of the base wall.

20. The modular assembly from claim 1, wherein the combination bracket comprises a power connection at a side of the sensor socket opposite the nozzle socket, the power connection being connectable to a power source, and at least one of the sensor and the check valve being electrically connectable with the power connection to be supplied with power from the power source.

21. The modular assembly from claim 1, wherein the spray nozzle comprises a static fan spray nozzle and the nozzle outlet comprises a fan-producing outlet configured to produce a static fan spray pattern.

22. The modular assembly from claim 1, wherein the spray nozzle comprises a jet spray nozzle comprising a nozzle body and a jet insert inserted into the nozzle body and defining the nozzle outlet, the nozzle outlet comprising a jet-producing outlet configured to produce a static jet spray pattern.

23. The modular assembly from claim 1, wherein the spray nozzle comprises an oscillating fan spray nozzle comprising a nozzle body, a spherical body inserted into the nozzle body and supporting a spray-building chip, the chip defining the nozzle outlet and configured to generate an oscillating fan jet.

24. The modular assembly from claim 1, wherein the spray nozzle comprises a combination spray nozzle comprising a nozzle body and a spray-building chip inserted into the nozzle body, the chip defining the nozzle outlet, the nozzle outlet comprising a fan jet exit opening, the chip further defining at least one other outlet, the at least one other outlet comprising a point jet exit opening.

25. The modular assembly from claim 1, wherein the spray nozzle comprises a dual media spray nozzle comprising:
an inlet portion having the nozzle inlet, the nozzle inlet comprising a first media inlet, wherein the inlet portion further having a second media inlet separate from the first media inlet; and
a spray element having the nozzle outlet, the nozzle outlet comprising a first media outlet in communication with the first media inlet, and at least one other outlet, the at least one other outlet comprising a second media outlet in communication with the second media inlet.

26. The modular assembly from claim 1, wherein the spray nozzle comprises a heatable spray nozzle comprising a fluid chamber and a heating line within the fluid chamber.

* * * * *